United States Patent [19]
Hashimoto et al.

[11] Patent Number: 5,810,155
[45] Date of Patent: Sep. 22, 1998

[54] OBJECT LEVITATING APPARATUS OBJECT TRANSPORTING APPARATUS AND OBJECT LEVITATING BEARING ALONG WITH AN OBJECT LEVITATING PROCESS AND OBJECT TRANSPORTING PROCESS

[75] Inventors: Yoshiki Hashimoto; Ryoji Tsuchiko; Satoshi Arai, all of Tokyo, Japan

[73] Assignee: Kaijo Corporation, Tokyo, Japan

[21] Appl. No.: 882,045

[22] Filed: Jun. 25, 1997

Related U.S. Application Data

[62] Division of Ser. No. 220,635, Mar. 31, 1994.

[30] Foreign Application Priority Data

| Jul. 12, 1993 | [JP] | Japan | 5-195089 |
| Nov. 11, 1993 | [JP] | Japan | 5-305781 |
| Nov. 11, 1993 | [JP] | Japan | 5-305782 |
| Nov. 11, 1993 | [JP] | Japan | 5-305783 |
| Mar. 7, 1994 | [JP] | Japan | 6-062097 |

[51] Int. Cl.$^6$ .................................................. B65G 35/00
[52] U.S. Cl. ......................... 198/630; 310/323; 198/752.1
[58] Field of Search .................................... 198/619, 630, 198/752.1, 756; 181/0.5; 310/322, 323, 328; 271/267, 270

[56] References Cited

U.S. PATENT DOCUMENTS

| 4,218,921 | 8/1980 | Oran et al. | 73/505 |
| 4,284,403 | 8/1981 | Rey | 432/1 |
| 4,393,708 | 7/1983 | Barmatz et al. | 73/505 |
| 4,402,221 | 9/1983 | Lee et al. | 73/505 |
| 4,420,977 | 12/1983 | Elleman et al. | 73/505 |
| 4,447,251 | 5/1984 | Dunn et al. | 65/142 |
| 4,463,606 | 8/1984 | Barmatz | 73/505 |
| 4,549,435 | 10/1985 | Barmatz et al. | 73/505 |
| 4,757,227 | 7/1988 | Danley et al. | 310/323 |
| 4,763,776 | 8/1988 | Okumura et al. | 198/630 |
| 4,777,823 | 10/1988 | Barmatz et al. | 73/505 |
| 4,841,495 | 6/1989 | Danley et al. | 367/191 |
| 4,962,330 | 10/1990 | Lierke et al. | 310/323 |
| 5,006,749 | 4/1991 | White | 310/323 |
| 5,036,944 | 8/1991 | Danley et al. | 181/0.5 |
| 5,062,622 | 11/1991 | Kataoka et al. | 271/270 |
| 5,096,017 | 3/1992 | Rey et al. | 181/0.5 |
| 5,149,080 | 9/1992 | Yamamoto | 271/265 |
| 5,215,688 | 6/1993 | Williamson et al. | 264/14 |
| 5,216,313 | 6/1993 | Ohinishi et al. | 310/323 |
| 5,257,676 | 11/1993 | Merkley et al. | 181/0.5 |
| 5,309,049 | 5/1994 | Kawada et al. | 310/12 |
| 5,319,670 | 6/1994 | Fox | 373/138 |
| 5,348,287 | 9/1994 | Yamamoto et al. | 271/267 |
| 5,386,169 | 1/1995 | Dubruque | 310/323 |
| 5,455,478 | 10/1995 | Kimura et al. | 310/323 |

OTHER PUBLICATIONS

Clancy et al., "Electrostatic and acoustic instrumentation for material science processing in space", 7/80, Acta Astronautica, Col. 7, pp. 877–891.

*Primary Examiner*—James R. Bidwell
*Attorney, Agent, or Firm*—Sughrue, Mion, Zinn, Macpeak & Seas, PLLC

[57] ABSTRACT

An object levitating apparatus, an object transporting apparatus equipped with the object levitating apparatus, and an object levitating bearing as well as an object levitating process and object transporting process are described which, simultaneous to not placing restrictions on the material and so forth of the objects handled, are able to handle objects having relatively large weights and dimensions, while also being compact in size, inexpensive, preferable in terms of safety and so forth, and easy to control.

4 Claims, 33 Drawing Sheets

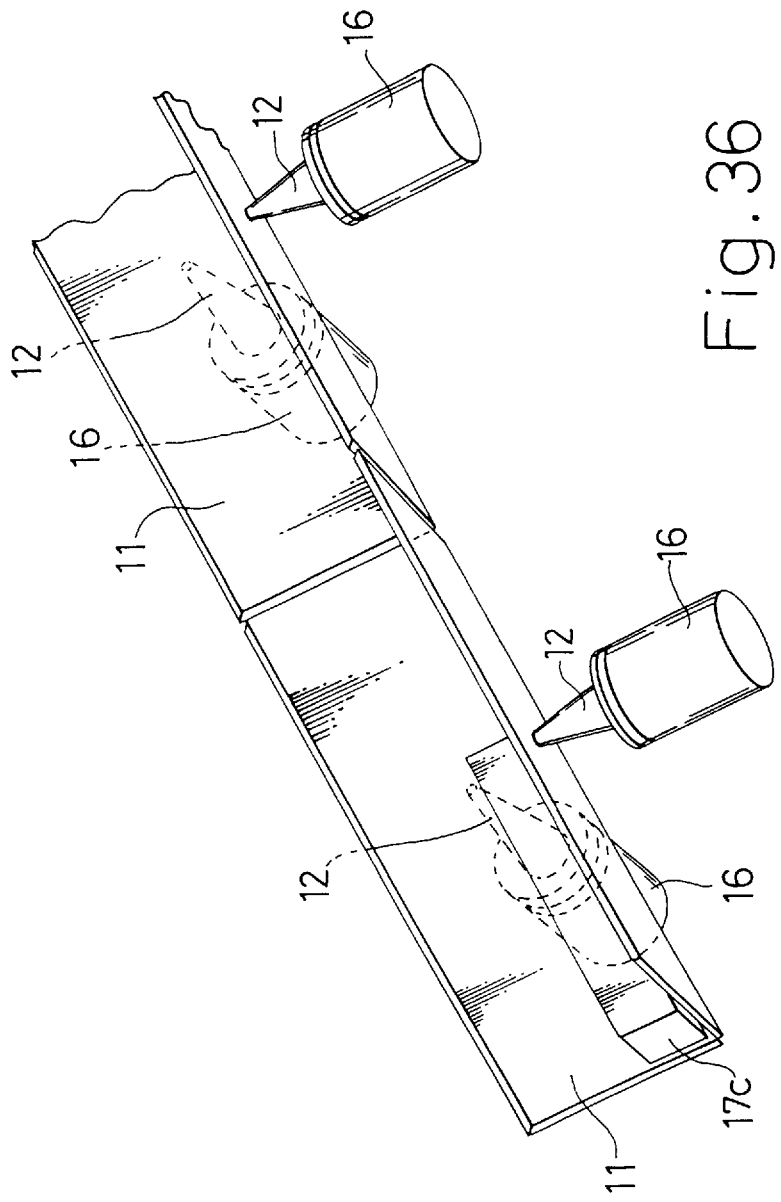

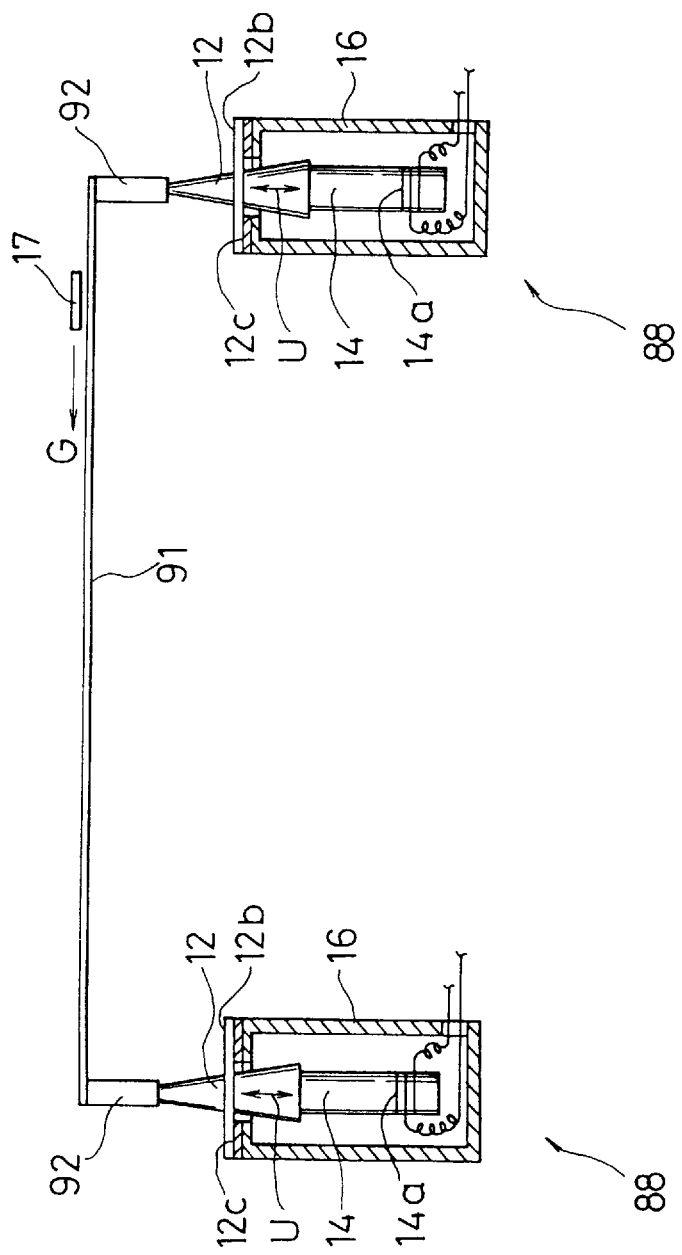

OBJECT LEVITATING APPARATUS OBJECT TRANSPORTING APPARATUS AND OBJECT LEVITATING BEARING ALONG WITH AN OBJECT LEVITATING PROCESS AND OBJECT TRANSPORTING PROCESS

This is a divisional of Application Ser. No. 08/220,635 filed Mar. 31, 1994.

BACKGROUND OF THE INVENTION

1. Field of the Invention

The present invention relates to an object levitating apparatus, which levitates an object in air (the term "levitate" here refers to the action of lifting an object so as to be in a floating state), an object transporting apparatus which uses said object levitating apparatus, and an object levitating bearing, along with an object levitating process and object transporting process.

2. Description of the Prior Art

The following systems are known in the prior art as examples of this type of apparatus.

(1) A system wherein an object is magnetically levitated and transported using an alternating current magnetic field flowing through a coil;

(2) A system wherein an object is levitated and transported using the Meissner effect of superconductivity; and, (3) A system wherein an object is levitated and transported using pressurized air such as compressed air.

In the apparatuses described in (1) and (2) above, together with the object to be levitated and transported being limited to a ferromagnetic substance or semiconductor, these apparatuses also have the disadvantage of being unable to be applied to objects for which the placing under conditions of being subjected to magnetism is undesirable. In addition, with respect to the apparatus above which uses the Meissner effect of superconductivity, since an expensive coolant is required to cool a coil to an extremely low temperature, together with this leading to increased costs with respect to the consumption of this coolant, considerations also must be taken with respect to the safety of the coolant. Moreover, this apparatus also has the disadvantage of having to be made extremely large in size in order to levitate and transport objects for an extended period of time in a stable state.

On the other hand, in the apparatus described in (3) above, since a pressurized gas is required to be supplied to the entire surface of the object transport path, together with having to provide an elaborate pressurized gas supply device which thereby makes it difficult to reduce the size of the entire apparatus, this apparatus also suffers the disadvantage of encountering difficulty in controlling the pressure of the supplied gas so that it remains uniform over a wide range. In addition, in the case of using said apparatus under conditions in which the atmosphere must be kept clean, such as in a so-called "clean room", a device is required for suctioning and recovering any gas that escapes from the above-mentioned pressurized gas supply device to prevent diffusion of said escaped gas. In addition to this being an additional obstacle to reducing the size of the apparatus, this apparatus also has the disadvantage in that it is difficult to completely recover the gas.

However, an apparatus like that shown in FIG. 1 has recently been developed. Furthermore, this apparatus is disclosed on pages 745 and 746 of the "Lecture Collection of the Japan Acoustics Society" published on Oct. 3, 1983. Namely, in FIG. 1, a standing wave (not shown) is produced between stepped circular diaphragm 2, vibrated by vibrating device 1, and correspondingly arranged reflecting plate 3, and a plurality of Styrofoam spheres 4 (weight: 1.2 mg, diameter: 4 mm) are levitated by a sound field. Furthermore, in FIG. 1, the direction of gravitational force is shown with arrow g. In this case, it has been verified that each of the spheres 4 is stationary in the air at an interval of ½ the wavelength of the ultrasonic waves, and their positions are at the valleys of sound pressure. In addition, the size of spheres able to be levitated is no more than ½ the wavelength, and their weight is considered to be related to sound pressure.

However, in this type of apparatus which uses a standing wave to make an object become stationary in the air at the locations of its nodes, the sphere 4 used for the test piece is currently limited to that which is extremely lightweight, and the vibration amplitude of diaphragm 2 must be made extremely large in order to levitate heavier and larger objects. Thus, in consideration of the stress-related destruction of diaphragm 2 and horn 1$a$ (see FIG. 1), it would be difficult for this apparatus to stably levitate a heavy object for an extended period of time, thus making practical application of this apparatus far from attainable. In addition, although the use of a process in this constitution whereby sound waves are converged into powerful sound waves to allow levitation of relatively heavy objects can be considered, since sound waves would act on a small surface area in comparison with the diameter of diaphragm 2, the result would still be that the apparatus would still only be applicable to small objects.

SUMMARY OF THE INVENTION

In consideration of the above-mentioned disadvantages of the prior art, the object of the present invention is to provide an object levitating apparatus, an object transporting apparatus equipped with said object levitating apparatus as well as an object levitating process and object transporting process, which together with not placing restrictions on the material and so forth of the objects handled, is able to handle objects having relatively large weights and dimensions, while also being compact in size, inexpensive, preferable in terms of safety and so forth, and easy to control. Moreover, another object of the present invention is to provide an object levitating bearing which uses an object levitating apparatus.

The object levitating apparatus according to the present invention is equipped with a vibrator and an ultrasonic excitation device which excites said vibrator, wherein an object is levitated above the surface of said vibrator by the radiation pressure of sound waves of said vibrator.

In addition, the object transporting apparatus according to the present invention is equipped with a vibrator, an ultrasonic excitation device which excites said vibrator, and a traveling device which causes an object to travel, wherein an object is levitated and transported above the surface of said vibrator by the radiation pressure of sound waves of said vibrator.

In addition, the object levitating process according to the present invention levitates an object above the surface of a vibrator by the radiation pressure of sound waves of said vibrator generated by exciting said vibrator.

Moreover, the object transporting apparatus according to the present invention is equipped with a vibrator and an ultrasonic excitation device which excites said vibrator, wherein the thickness of said vibrator gradually changes in the radiating direction of sound waves generated by said ultrasonic excitation device.

In addition, the object transporting process according to the present invention levitates an object above the surface of a vibrator by the radiation pressure of sound waves of said vibrator produced by excitation of said vibrator, and transports said levitated object according to differences in amplitude at the vibration site of said vibrator.

In addition, the object levitating apparatus is equipped with a vibrator and an ultrasonic excitation device which excites said vibrator, and levitates an object by the radiation pressure of sound waves of said vibrator, wherein said vibrator is composed with a cylindrical member, said ultrasonic excitation device is coupled to the periphery of said cylindrical member so that the direction of vibrations generated by said ultrasonic excitation device is perpendicular to the axial direction of said cylindrical member, and an object is levitated by the radiation pressure of sound waves within said cylindrical member.

In addition, the object levitating bearing as claimed in the present invention has insertion members, which are inserted into a cylindrical member using said object levitating apparatus, and a drive device which transmits rotary driving force to at least one of said insertion members.

In addition, the object transporting apparatus as claimed in the present invention is equipped with a vibrator, an ultrasonic excitation device which excites said vibrator, and a traveling device which causes an object to travel, which levitates and causes an object to travel by the radiation pressure of sound waves of said vibrator, wherein said vibrator is composed of a cylindrical member, said ultrasonic excitation device is coupled to the periphery of said cylindrical member so that the direction of vibrations generated by said ultrasonic excitation device is perpendicular to the axial direction of said cylindrical member, and an object is levitated and caused to travel within said cylindrical member by the radiation pressure of sound waves in said cylindrical member.

In addition, the object levitating process as claimed in the present invention excites a vibrator composed of a cylindrical member in a direction perpendicular to the axial direction of said cylindrical member, and levitates an object within the cylinder of said vibrator by the radiation pressure of sound waves of said vibrator.

Moreover, the object levitating apparatus according to the present invention is equipped with a vibrator and an ultrasonic excitation device which excites said vibrator, which levitates an object above the surface of said vibrator by the radiation pressure of sound waves of said vibrator, wherein said vibrator is composed of at least one set of vibrators arranged so that the vibrating surfaces are mutually perpendicular.

In addition, the object transporting apparatus as claimed in the present invention is equipped with at least one pair of vibrators arranged so that the vibrating surfaces are mutually perpendicular, an ultrasonic excitation device which excites said vibrators, and a traveling device which causes an object to travel, wherein an object is levitated and caused to travel above the surfaces of said vibrators by the radiation pressure of sound waves of said vibrators.

Moreover, the object levitating process as claimed in the present invention excites vibrators from mutually perpendicular directions, and levitates an object above the surface of said vibrators by the radiation pressure of sound waves of said vibrators.

In addition, the present invention is equipped with a vibrator, ultrasonic excitation device which excites said vibrator, and a traveling device which causes an object to travel; in an energy transporting apparatus which levitates an object and causes said object to travel above the surface of said vibrator by the radiation pressure of sound waves of said vibrator, wherein said traveling device has an energy conversion device which converts said sound waves into progressive waves by converting ultrasonic energy, generated by ultrasonic vibration generation units of said ultrasonic excitation device, into electrical energy, and a plurality of said ultrasonic vibration generation units are arranged in a row in the direction in which the object is to be made to travel, which together with selectively generating ultrasonic energy with respect to each of said ultrasonic vibration generation units, perform energy conversion thereby allowing reciprocating travel of the object.

BRIEF DESCRIPTION OF THE DRAWINGS

FIG. 36 is a perspective view of the essential portion of a variation of the object levitating apparatus of FIG. 35.

FIG. 38 is a front view, including a partial cross-section, of an object transporting apparatus as a thirteenth embodiment of the present invention.

DESCRIPTION OF THE PREFERRED EMBODIMENTS

The following provides an explanation of the preferred embodiments of the present invention.

Figure 1:
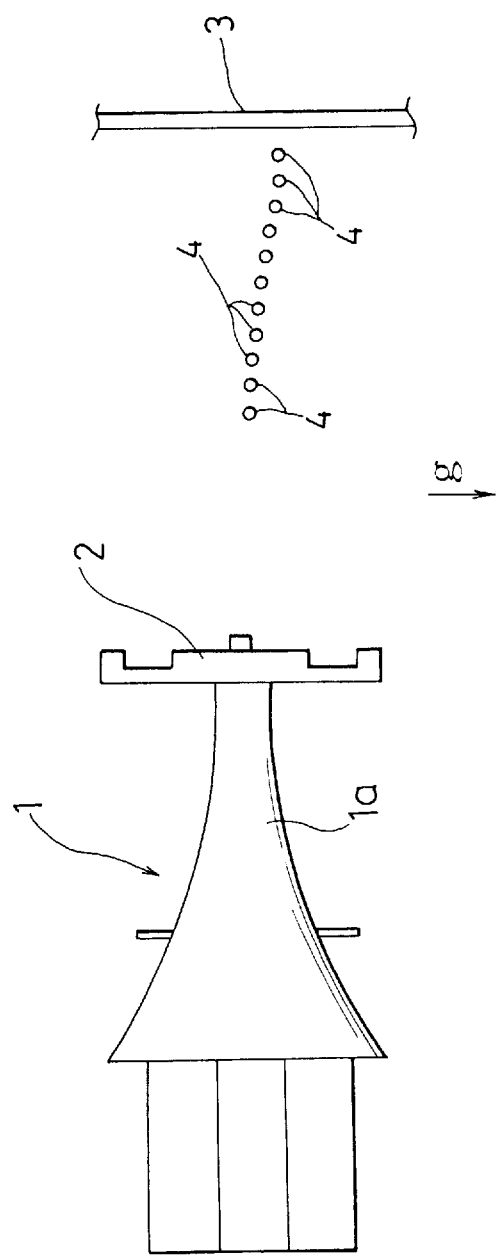
FIG. 1 is a front view showing the gist of the apparatus of the prior art.
Figure 2:
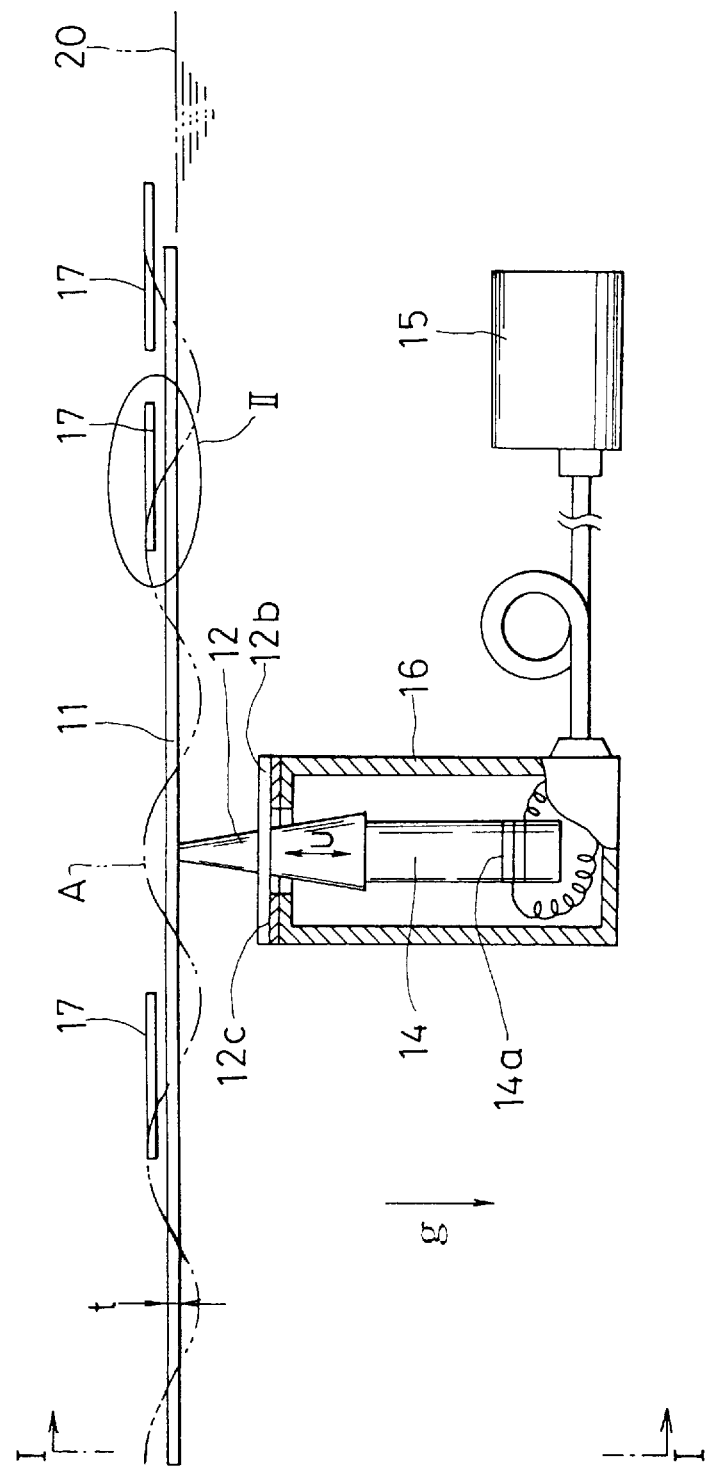
FIG. 2 is a front view, including a partial cross-section, of an object transporting apparatus as a first embodiment of the present invention.
Figure 3:
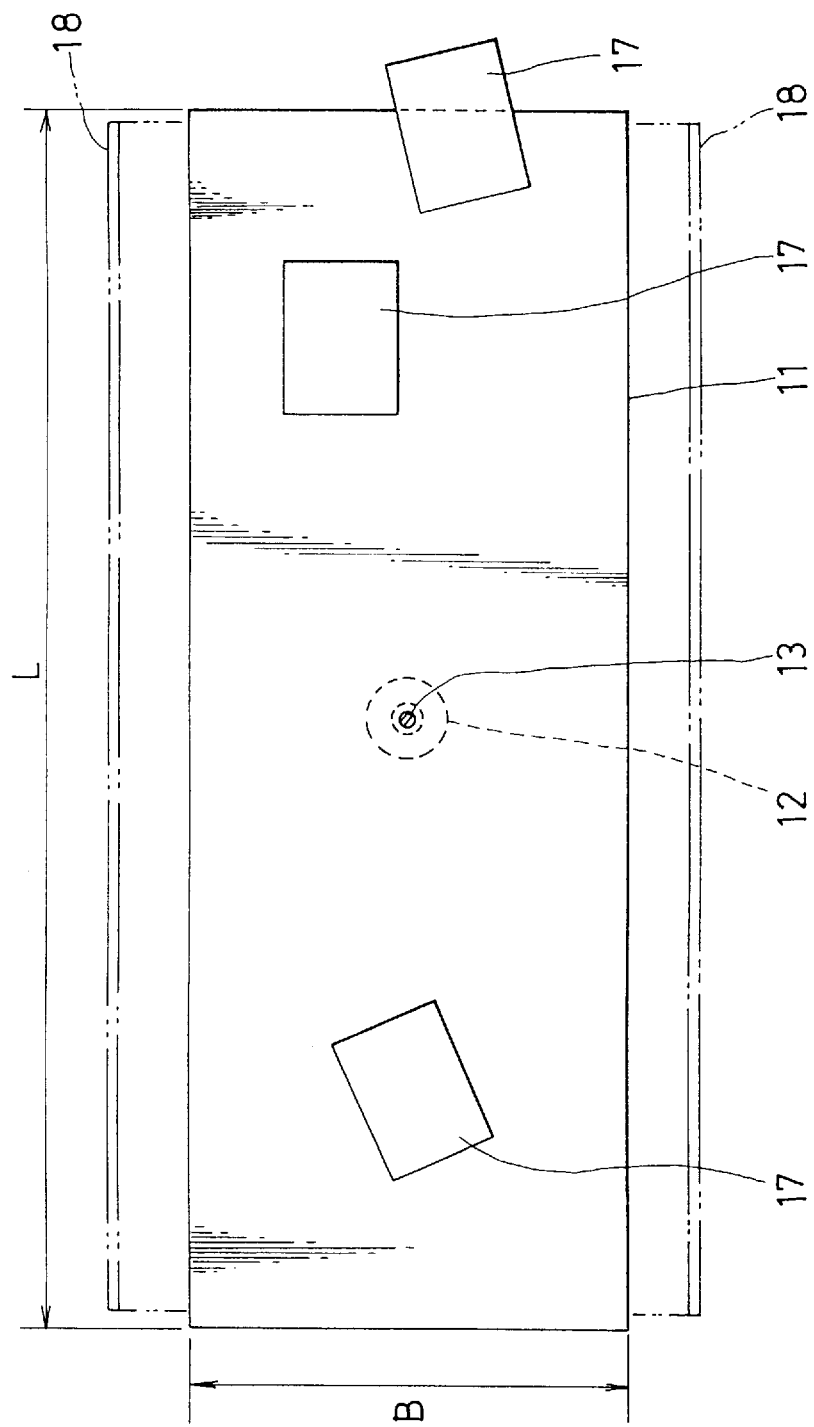
FIG. 3 is an overhead view of the object transporting apparatus shown in FIG. 2.
Figure 4:
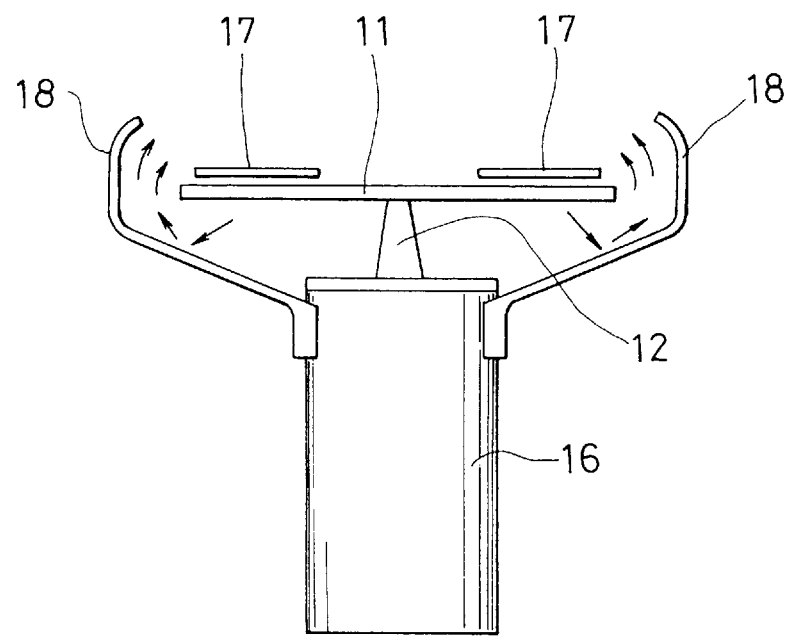
FIG. 4 is a perspective taken along arrows I—I relating to FIG. 2.

FIGS. 2 through 4 show an object transporting apparatus as a first embodiment of the present invention.

As shown in the drawings, said object transporting apparatus has vibrator 11 formed into the shape of a rectangular plate. This vibrator 11 is fastened to the end of horn 12 at its central portion by screw 13 (shown in FIG. 3). However, the shape of vibrator 11 is not limited to a flat plate, but can be suitably changed according to the application and so forth. In addition, various other means may be used for attaching vibrator 11 to horn 12, such as soldering or welding, and the attachment position can be changed. Furthermore, in FIG. 2, the vibrating direction of ultrasonic vibrations from horn 12 is shown with arrow U. Thus, horn 12 performs longitudinal vibration. The length L (see FIG. 3) and breadth B of vibrator 11 is stipulated by the resonance length of flexural vibration based on the vibrations propagating from horn 12, and flexural vibration is taken to be that in the manner of deflection curve A shown in FIG. 2.

Incidentally, vibrator 11 of the present embodiment has a length L of 434 mm, breadth B of 154 mm and thickness t (shown in FIG. 2) of 3 mm. Duralumin is used for the material. In addition, horn 12 is excited at a frequency of roughly 19.4 Hz, and vibrations are applied to the end having an amplitude of roughly 32 $\mu$m p-p. As a result of using these settings, the nodes of the vibrations of vibrator 11 appear at an interval of roughly 54.25 mm in its lengthwise direction, and at an interval of roughly 19.25 mm in the direction of its breadth, resulting in a lattice-shaped vibration mode. Furthermore, each of the dimensions, resonance frequency, its amplitude and form of vibration mode of vibrator 11 can be set appropriately. For example, length L can be set to 1000 mm or more.

As shown in FIG. 2, horn 12 is coupled to oscillator 14 on the opposite side on which it is coupled to vibrator 11. Electrode 14*a* of this oscillator 14 is connected to generator 15, and oscillator 14 generates ultrasonic vibrations as a result of being excited by said generator 15. Horn 12 mechanically amplifies the vibrations generated by this oscillator 14. Furthermore, flange 12*b* is formed on horn 12, and said flange 12*b* is fastened to case 16 housing oscillator 14 and said horn 12 with packing 12*c* in between.

The above-mentioned horn 12, oscillator 14, generator 15 and their related peripheral members are generically referred to as an ultrasonic excitation device.

As shown in FIGS. 3 and 4, plate-shaped sound wave reflecting members 18 are arranged along both sides of the transport path of object 17 to be transported, and are attached to case 16.

Next, the following provides an explanation of the action of an object transporting apparatus having the constitution described above.

To begin with, an explanation is provided regarding the action of an object levitating apparatus contained by said object transporting apparatus.

To begin with, as shown in FIG. 2, the position of the apparatus is adjusted so that vibrator 11 is parallel to a hypothetical horizontal surface 20 during operation of the apparatus. While in this state, power is supplied, oscillator 14 is excited by generator 15, horn 12 vibrates longitudinally and vibrator 11 is excited through said horn 12 to perform flexural vibration. Sound waves (not shown) are radiated from vibrator 11 due to the performing of flexural vibration by said vibrator 11.

After vibrator 11 has begun vibrating in the manner described above, object 17 is placed on vibrator 11 and released gently. However, object 17 may also be placed on vibrator 11 in advance before beginning vibration of vibrator 11.

Figure 5:
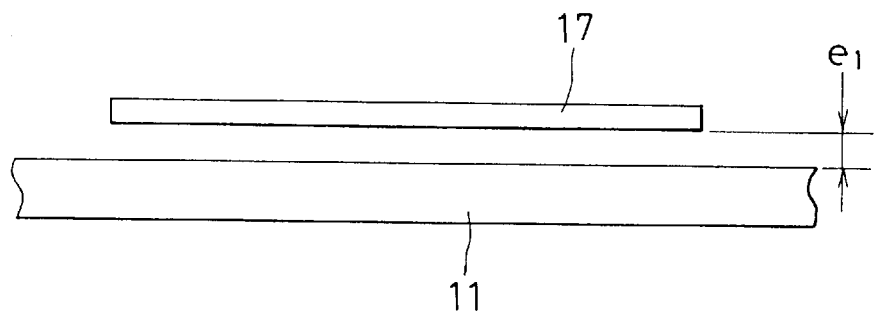
FIG. 5 is an enlarged view of section II in FIG. 2.

FIG. 5 is an enlarged view of section II in FIG. 2. As is clear from said drawing, object 17 is levitated at a distance $e_1$ from the surface of vibrator 11 due to the radiation pressure of sound waves emitted from said vibrator 11. Here, levitation distance $e_1$ refers to the distance based on the surface of vibrator 11 being 0 (zero) in the stationary state while still not emitting sound waves. In addition, although vibrator 11 does not demonstrate flexural vibration if the surface area of vibrator 11 is small, but rather vibrations in the same vibration mode as the longitudinal vibration applied by horn 12, in this case as well, object 17 is levitated in the same manner. Furthermore, if the supply of power to the ultrasonic excitation device is interrupted, sound waves from vibrator 11 stop immediately and object 17 makes contact with vibrator 11.

Figure 6:
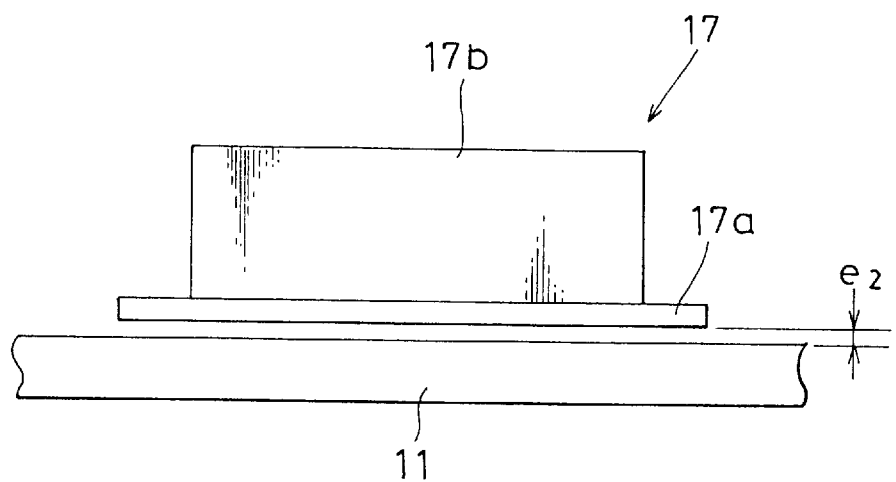
FIG. 6 is a drawing showing another constitution of an object to be transported by the object transporting apparatus shown in FIGS. 2 through 4.

Object 17 shown in FIGS. 2 through 5 is simply a plate-shaped object having relatively light weight. Hypothetical examples of said object 17 include a business card or thin plate and so forth made of plastic or metal. Although these objects were attempted to be levitated serving as test pieces after fabrication of the prototype of the apparatus shown in the present embodiment, experiments were also conducted on an object 17 having a form like that shown in FIG. 6. Namely, this object is composed of plate-shaped carrier 17a and heavy object 17b placed on said carrier 17a. FIG. 6 shows the distance between carrier 17a and vibrator 11 in this case as $e_2$. Furthermore, examples of heavy object 17b which requires this type of carrier 17a include objects which cannot be levitated independently, such as nearly spherical objects or those having an irregular shape, as well as powders or liquids and so forth contained in a container. However, since said heavy object 17b ought to be able to be levitated by itself by removing carrier 17a provided its bottom surface is flat, in addition to conducting levitation experiments using this type of heavy object 17b alone, experiments were also conducted on various objects. These experiments as well as the various data and so forth obtained from said experiments will be described later.

As a result of the above-mentioned experiments, it was verified that there are no restrictions whatsoever on the material of the test piece used for levitation, and any type of object can be levitated. In addition, although experiments were conducted on objects having a wide range of weights, while light objects were naturally levitated, the heaviest object levitated during these experiments was a metal object weighing roughly 3.26 Kg and having a diameter of roughly 140 mm. The maximum levitation force applied to the object by the radiation pressure of sound waves from vibrator 11 calculated from these results was determined to be 21.4 g/cm². Accordingly, when this value is converted according to the surface area of vibrator 11, if the object was tentatively assumed to extend over the entire surface of vibrator 11, it would be possible to levitate such an object up to a weight of 14.3 Kg. However, although the input electrical power supplied to the vibration system of the apparatus during levitation of relatively lightweight objects was only required to be 130 W, 160 W was required in the case of levitating heavy objects such as that described above.

In addition, as described above, although objects of various materials were used in these levitation experiments, it was determined that the greater the degree of flatness of the bottom surface in opposition to the surface of vibrator 11, the easier it is to levitate heavy objects. However, it was also confirmed that the degree of flatness of the surface of vibrator 11 along with the stability of the overall apparatus are also important.

As is clear from the above, the apparatus as claimed in the present invention is able to levitate all types of objects, regardless of whether or not they are magnetic, without any restrictions on the material and so forth of the object used, and including objects which cannot be placed in a magnetic field. Said apparatus is also able to transport objects in the manner to be described later. In addition, said apparatus is also able to levitate and transport objects having relatively large weight and dimensions.

Continuing, the following provides an explanation of the action of an object transport apparatus containing the object levitating apparatus described above. This object transporting apparatus consists of adding a traveling device which causes levitated object 17 to travel to the constitution of the object levitating apparatus described above.

Figure 7:
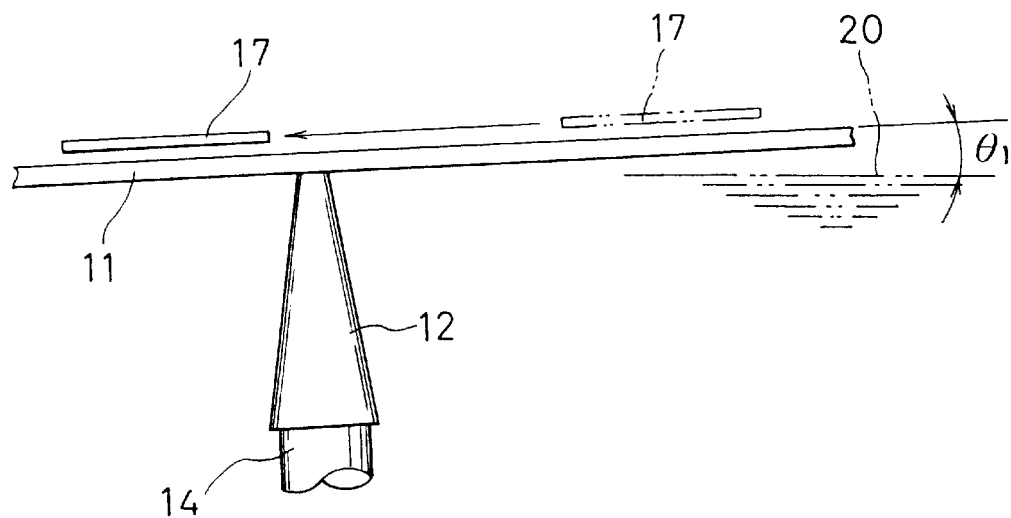
FIG. 7 is a drawing explaining the operation of the object transporting apparatus shown in FIGS. 2 through 4.

The constitution like that shown in FIG. 7 is used as an example of this device for causing travel of object 17. Namely, the surface of vibrator 11 is inclined by an angle $\theta_1$ with respect to hypothetical horizontal plane 20. Acceleration is produced based on gravitational force in object 17 as a result of this angle $\theta_1$ thereby resulting in travel of object 17. However, this angle $\theta_1$ was set to 1°–5° based on the results of experiments. In the case of said constitution, since a driving source for travel of object 17 is not especially required and the apparatus is simply inclined, it is easy to achieve reduced size of the overall apparatus and reduced costs. Furthermore, as described above, if the supply of power to the ultrasonic excitation device is interrupted, object 17 stops immediately and makes contact with vibrator 11 causing it to stop due to frictional resistance.

However, at the time object 17 is transported in the manner described above, deviation from the transport path is prevented by the action described below.

Namely, as shown in FIGS. 3 and 4, sound wave reflecting members 18 are arranged along both sides of said transport path. As is clear from FIG. 4, these sound wave reflecting members 18 do not make contact with vibrator 11, and guide sound waves towards the above-mentioned transport path while reflecting said sound waves radiated from the bottom surface of vibrator 11 as shown with the arrows in the drawing. Since this means that sound waves guided in this manner are present on the sides of the transport path, these sound waves serve as a wall that has the action of pushing back object 17 when it attempts to deviate from the transport path. Accordingly, deviation from the transport path by object 17 does not occur. In addition, according to said constitution, object 17 does not make contact with sound wave reflecting members 18. However, even if these sound wave reflecting members 18 are not provided, it has been confirmed that when object 17 is about to protrude from the edge of vibrator 11, it is pulled back to the inside by the action of sound waves radiating from said vibrator 11 itself.

Next, the following provides an explanation of other object transporting apparatuses each equipped with a traveling device different from the type in which object 17 is caused to travel by utilization of gravitational force as described above. Furthermore, with the exception of those portions described below, since each of these object transporting apparatuses is composed in the same manner as the object transporting apparatus shown as a first embodiment in FIGS. 2 through 4 and 7, an explanation of the entire apparatus will be omitted to avoid repetition. As such, the explanation will only focus on the essential portion. In addition, those constituent members identical to the constituent members of the object transporting apparatus shown in FIGS. 2 through 4 and 7 are indicated using the same reference numerals in the following explanations.

Figure 8:
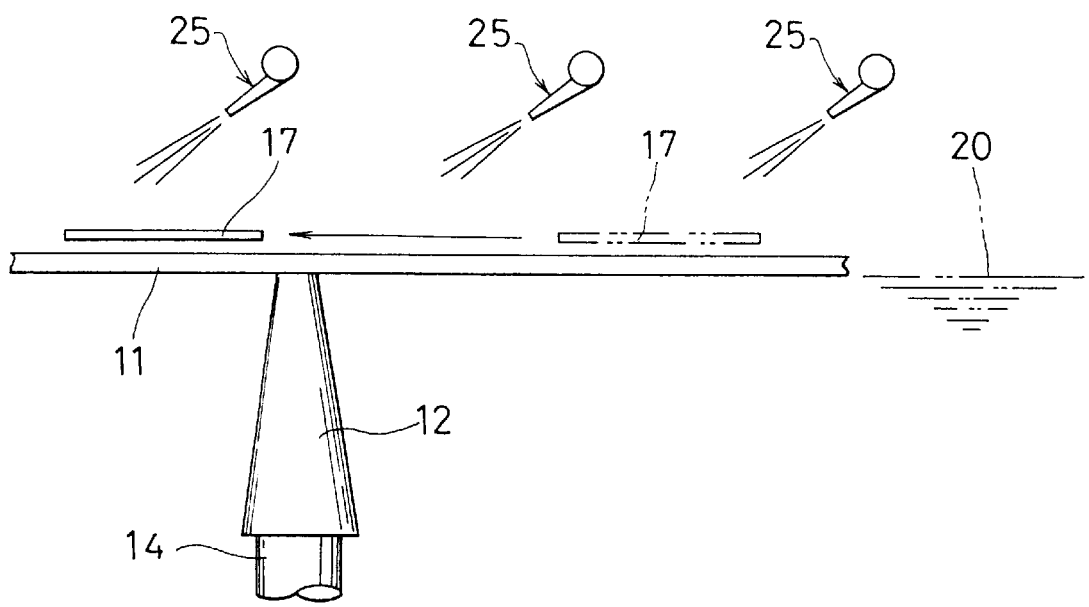
FIG. 8 is a front view of the essential portion of an object transporting apparatus as a second embodiment of the present invention.

FIG. 8 shows the essential portion of an object transporting apparatus as a second embodiment of the present invention.

As shown in the drawing, in said object transporting apparatus, vibrator 11 is parallel to hypothetical horizontal plane 20. The device for travel of object 17 has a plurality of nozzles 25 arranged in a row at mutually prescribed intervals along the direction in which object 17 is to travel. These nozzles 25 are, for example, arranged above vibrator 11 and blow compressed air towards object 17 from behind at an angle. Object 17 is accelerated by this blown compressed air resulting in travel. An air blowing device which acts as the above-mentioned traveling device is composed of these nozzles 25 and a compressor and so forth (not shown) which supplies compressed air to said nozzles 25. Furthermore, the gas that is blown after compression is not limited to air, but various gases can be used, provided environmental effects such as those on the atmosphere are allowed, according to the application.

Figure 9:
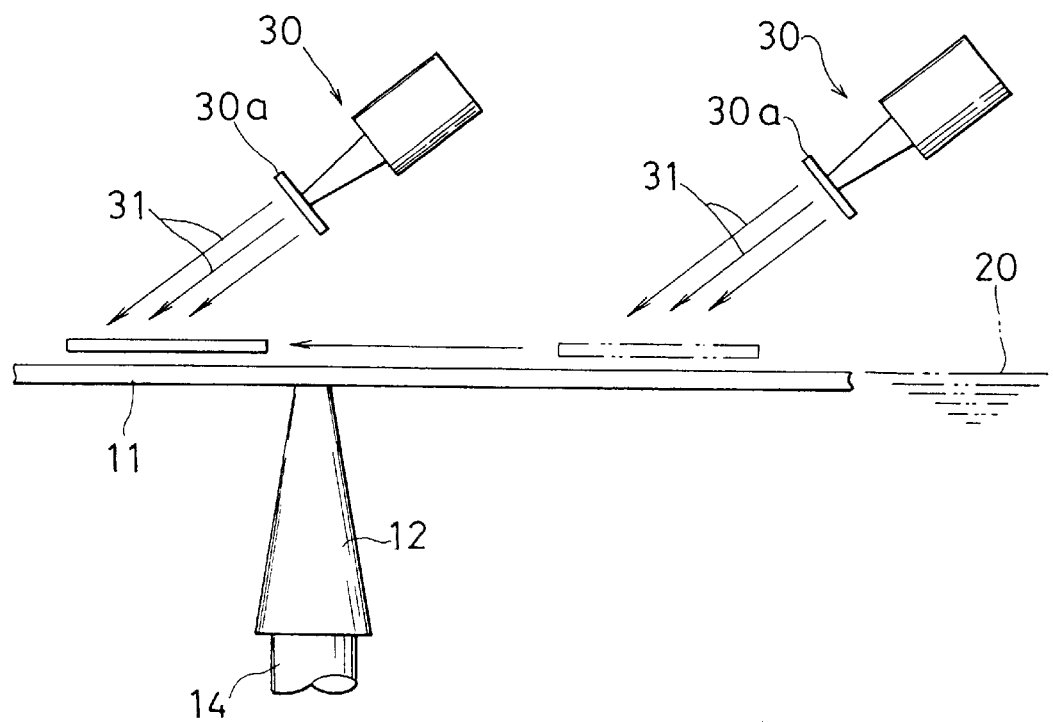
FIG. 9 is a front view of the essential portion of an object transporting apparatus as a third embodiment of the present invention.

FIG. 9 shows the essential portion of an object transporting apparatus as a third embodiment of the present invention. Although travel of object 17 was made to travel by blowing of air in the object transporting apparatus of the above-mentioned second embodiment, in this apparatus, ultrasonic waves are radiated to object 17 causing object 17 to travel as a result of this driving force.

Namely, as shown in the drawing, a plurality of ultrasonic radiators 30 are provided in a row at equal intervals along the direction in which object 17 is to travel. These ultrasonic radiators 30 are provided inclined at an angle so that ultrasonic waves 31 radiated from diaphragm 30$a$ equipped on each are directed downward and at a forward angle.

In said constitution, object 17 is accelerated and transported by the radiation pressure of sound waves emitted from each ultrasonic radiator 30.

Figure 10:
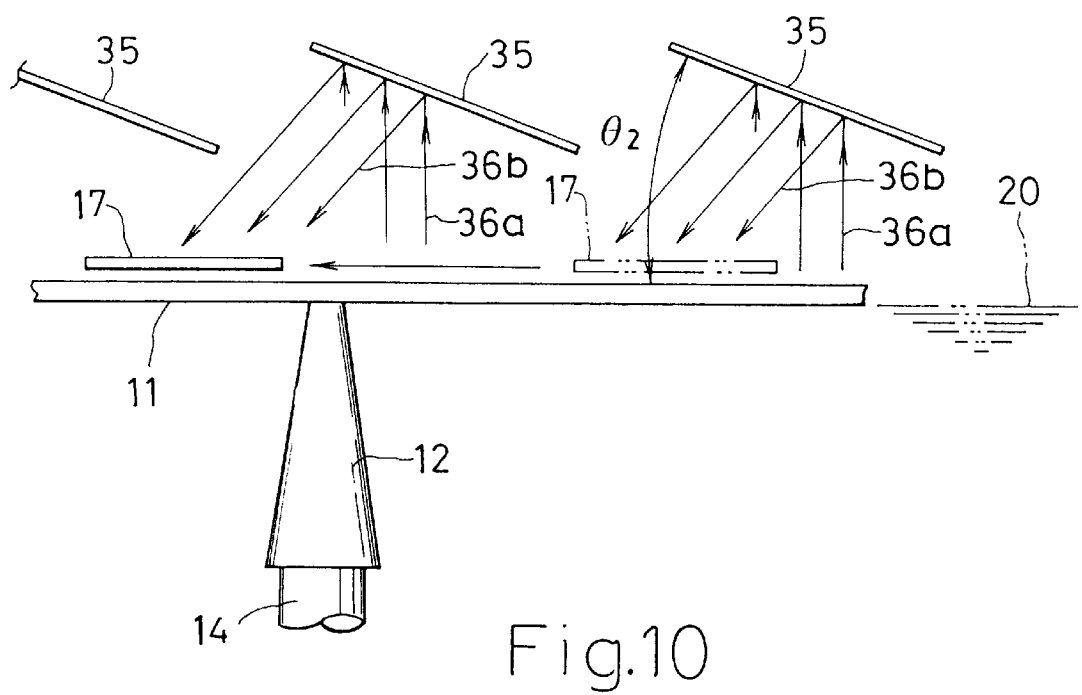
FIG. 10 is a front view of the essential portion of an object transporting apparatus as a fourth embodiment of the present invention.

FIG. 10 shows the essential portion of an object transporting apparatus as a fourth embodiment of the present invention. Although ultrasonic radiators are provided for propelling object 17 in the object transporting apparatus of the third embodiment shown in FIG. 9, in this embodiment, sound waves emitted by vibrator 11 itself act to propel the object.

As shown in the drawing, in the present embodiment, a plurality of plate-shaped reflecting members 35 are provided in a row along the direction in which object 17 is to travel above vibrator 11. Each reflecting member 35 is provided at an angle so as to form an angle of $\theta_2$ with respect to the surface of vibrator 11 as well as so that the front end is higher. Accordingly, sound waves 36$a$ radiated upward from vibrator 11 are reflected with these reflecting members 35 and proceed downward at a forward angle. Object 17 is then accelerated and transported by these reflected waves 36$b$.

Furthermore, although a plurality of reflecting members 35 are provided individually in the present embodiment, an alternative constitution may also be employed wherein a single, long reflecting member (not shown) is provided wherein a plurality of inclined portions are formed in a corrugated pattern.

In addition, in the second through fourth embodiments shown in FIGS. 8 through 10, respectively, although a plurality of nozzles 25, ultrasonic radiators 30 and reflecting members 35 are respectively provided in a row along the object transport path, a constitution can also be employed wherein these are moved to as to follow object 17 being transported in the form of a single unit.

Figure 11:
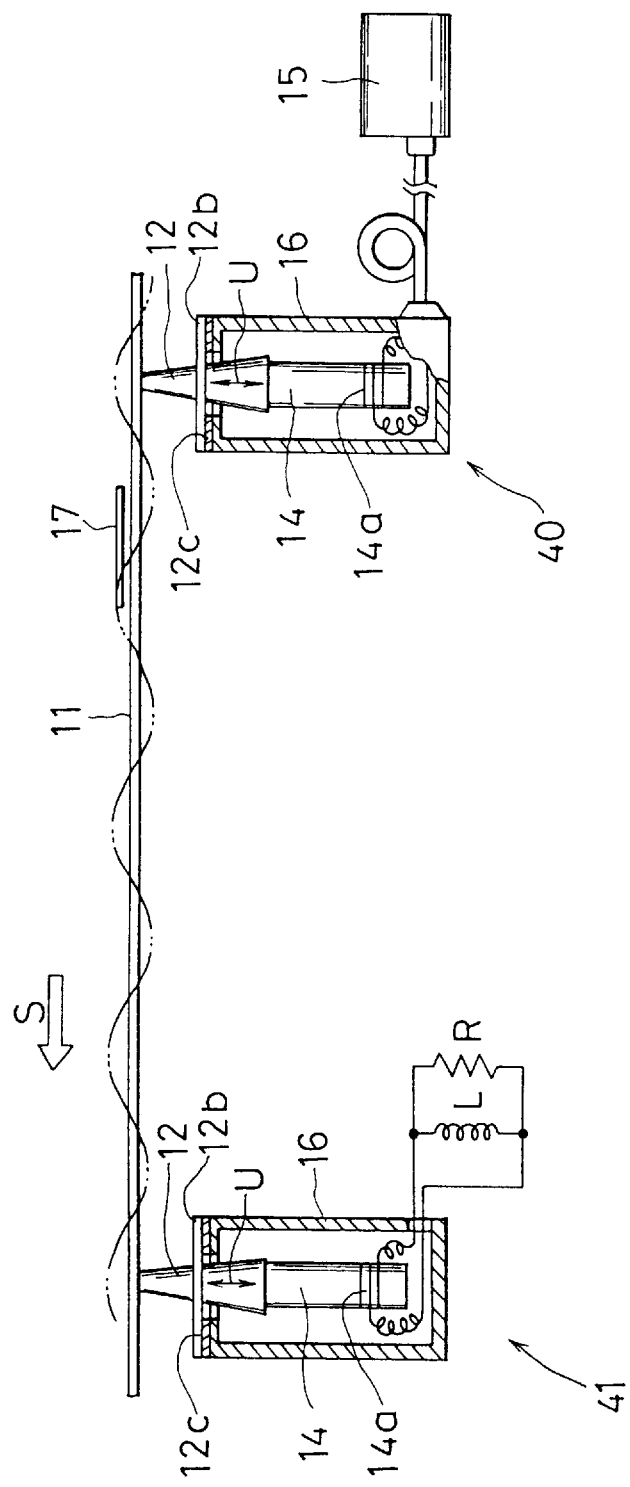
FIG. 11 is a front view, including a partial cross-section, of an object transporting apparatus as a fifth embodiment of the present invention.

FIG. 11 shows an object transporting apparatus as a fifth embodiment of the present invention. In said object transporting apparatus, the traveling means which causes object 17 to travel is composed in the manner described below.

As shown in the drawing, ultrasonic excitation device 40, which excites vibrator 11, is arranged on the right end of said vibrator 11, while energy conversion device 41, having essentially the same constitution as said ultrasonic excitation device 40, is arranged on the left end. This energy conversion device 41 converts the energy of ultrasonic waves emitted by vibrator 11 excited by ultrasonic excitation device 40 back to electrical energy. More specifically, a circuit consisting of resistor R and coil L is connected to electrode 14$a$ of oscillator 14 equipped on said energy conversion device 41. Electrical energy converted from ultrasonic energy in the form of mechanical energy is converted into Joule heat and dispersed as a result of passing through this circuit.

In said constitution, if this energy conversion device 41 is allowed to act simultaneous to the ultrasonic excitation device, the waves of flexural vibration produced in vibrator 11 become progressive waves as shown with arrow S. Object 17 then travels in the state of riding this progressive wave.

Figure 12:
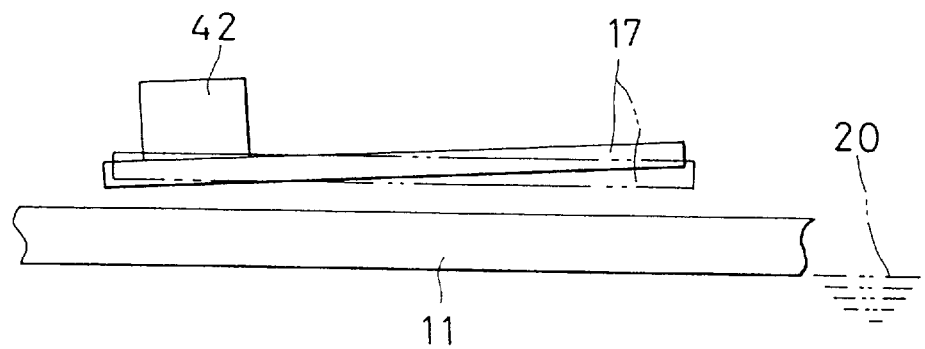
FIG. 12 is a front view of the essential portion of an object transporting apparatus as a sixth embodiment of the present invention.

FIG. 12 shows the essential portion of an object transporting apparatus as a sixth embodiment of the present invention.

As shown in the drawing, in said object transporting apparatus, weight 42 is loaded on the side of the direction of travel of object 17 as a means of travel for object 17. When the weight is loaded in this manner, since the distribution of weight differs between the side in the direction of travel and the side in the opposite direction, object 17 becomes inclined in a levitated state. This being the case, sound waves (not shown) radiated upward from vibrator 11 are reflected with the bottom surface of object 17, and those reflected waves (not shown) proceed downward at a backward angle. Object 17 is then accelerated by the driving force produced by these reflected waves causing it to travel. Furthermore, the distribution of weight may be differed to incline object 17 without using such a weight 42 by, for example, changing the thickness between the side in the direction of travel and the side in the opposite direction of vibrator 17 itself.

Figure 13:
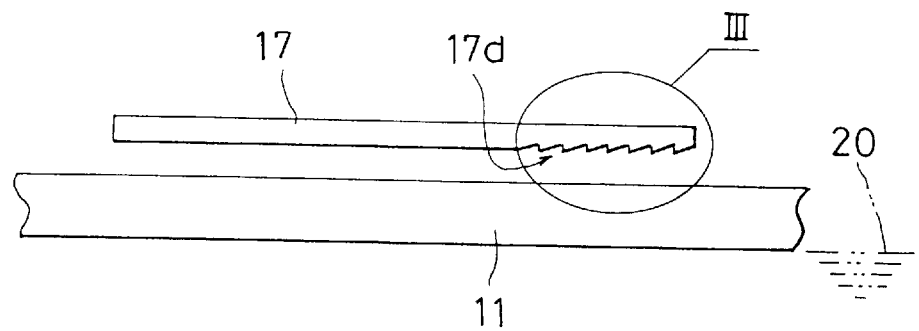
FIG. 13 is a front view of the essential portion of an object transporting apparatus as a seventh embodiment of the present invention.

FIG. 13 shows the essential portion of an object transporting apparatus as a seventh embodiment of the present invention.

Figure 14:
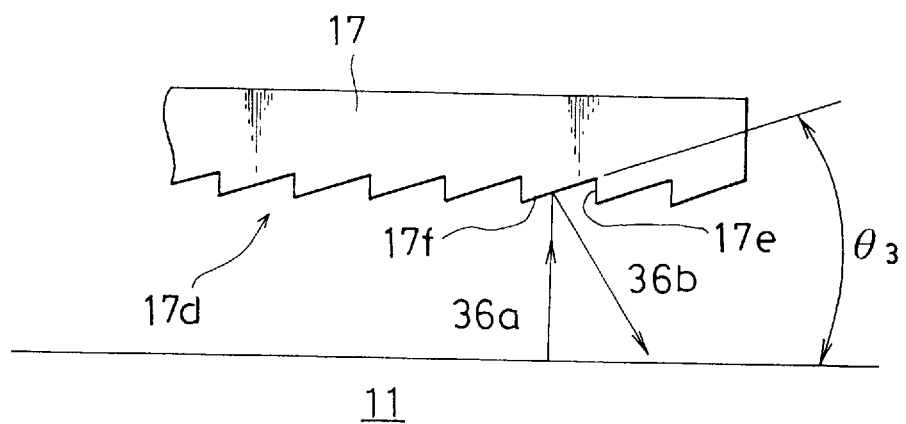
FIG. 14 is an enlarged view of section III in FIG. 13.

As shown in the drawing, in this object transporting apparatus, projections 17$d$ are formed in the bottom surface and to the back of object 17 as a means of travel for object 17. As is clear from FIG. 14, these projections 17$d$ are composed by forming vertical surface 17$e$ and inclined surface 17$f$ mutually and continuously in the direction in which said object 17 is to travel. Said inclined surface 17$f$ is formed to form an angle of $\theta_3$ with respect to the surface of vibrator 11 as well as so that the front end is lower. Accordingly, sound waves 36$a$ radiated upwards from vibrator 11 are reflected with these inclined surfaces 17f and proceed downward and at a backward angle. Object 17 is then accelerated and transported by the driving force of these reflected sound waves 36b.

However, as is shown in FIGS. 3 and 4, in the object transporting apparatuses of each of the embodiments described above, sound wave reflecting members 18 are provided along the transport path to prevent deviation of object 17 from the transport path. Sound waves emitted from the bottom surface of vibrator 11 and reflected along said sound wave reflecting members 18 act as walls. Although this constitution is able to accommodate objects up to a certain mass, when the mass of object 17 becomes excessively large, since the inertia when said object 17 is about to deviate outside the transport path is also large, it becomes difficult to control this deviation with a wall of sound waves alone. Therefore, the constitution shown in FIG. 15 is added.

Figure 15:
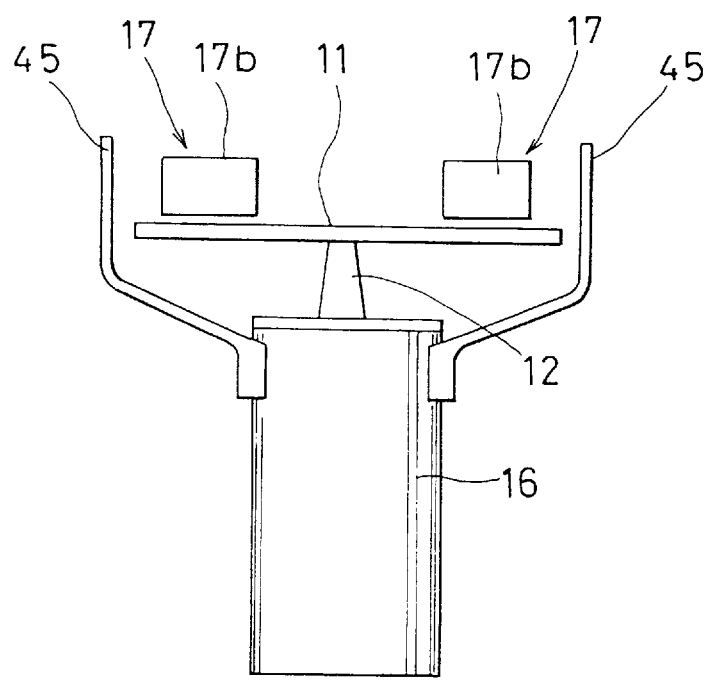
FIG. 15 is a side view relating to the object transporting apparatuses of each of the embodiments shown in FIGS. 2 through 14, showing variations of one portion of those apparatuses.

As shown in FIG. 15, flat plate-shaped deviation prevention members 45 are arranged on both sides of the transport path of objects 17 having a large weight (for example, those composed of heavy objects 17b alone). Accordingly, when objects 17 are about to deviate from the transport path, they make extremely light contact with the inside surfaces of these deviation prevention members 45 to avoid deviation.

Figure 16:
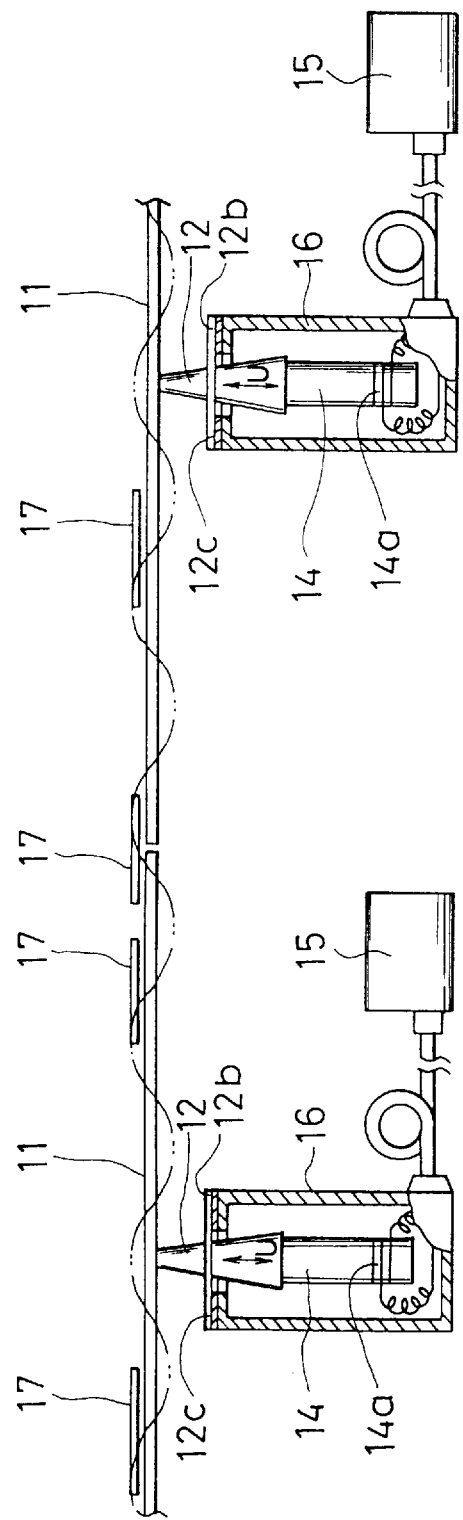
FIG. 16 is a front view, including a partial cross-section, showing a plurality of object transporting apparatuses arranged in a row.

Although each of the previously described embodiments indicated a single object transporting apparatus, as shown in FIG. 16, two or more object transporting apparatuses can be arranged linearly and in a row so that each of their transport paths is continuous. Thus, the length of the transport path can be set as desired resulting in a greater degree of freedom and excellent general applicability.

The following provides an explanation of a portion of the actual experiment described above.

Figure 17:
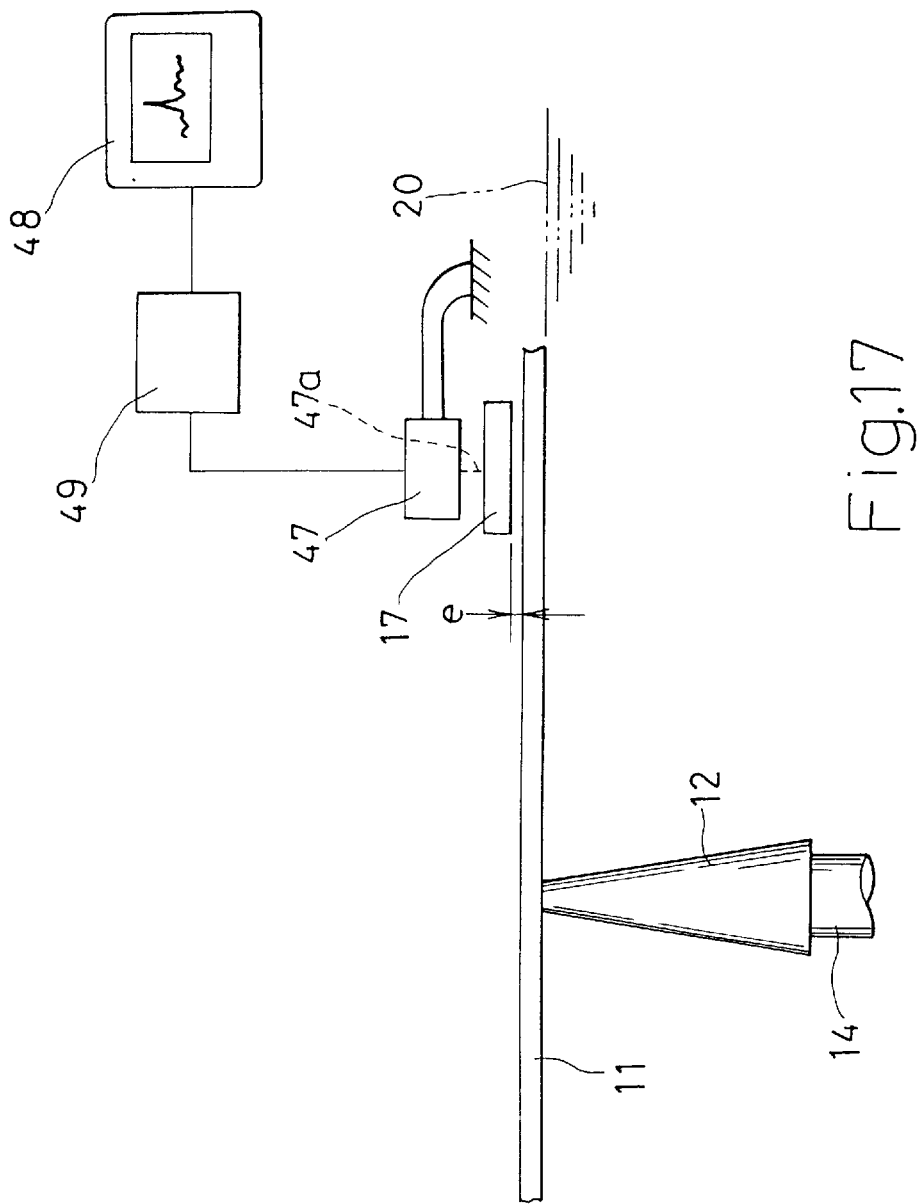
FIG. 17 is a front view showing the essential portion of an object levitating apparatus as claimed in the present invention, and the gist of a measuring apparatus which performs measurement relating to said apparatus.

A measuring apparatus like that shown in FIG. 17 was made available for this experiment. This measuring apparatus measures levitation distance e of each object 17 on vibrator 11. As shown in the drawing, said measuring apparatus has laser displacement gauge 47, oscilloscope 48 which displays the values measured by said laser displacement gauge 47, and displacement gauge body 49, which amplifies signals emitted by said laser displacement gauge 47 and is juxtapositioned between both to display values on oscilloscope 48.

The above-mentioned laser displacement gauge 47 radiates laser light 47a towards the upper surface of object 17 from directly above said object 17 to measure distance utilizing that reflected light. However, apparatuses of various known measurement principles can be employed. Measurement is specifically performed in the manner described below.

First of all, vibrator 1 is made to be in the stationary state without vibrating, and object 17 is placed on said vibrator 11. While in this state, the above-mentioned measuring apparatus is operated, and distance to the upper surface of object 17 in the stationary state is reset to 0 (zero), namely the reference for measurement of levitation distance. Next, object 17 is levitated by exciting vibrator 11. The measuring apparatus is again operated while the object is in this state and measurement is performed. Since the measured value obtained here is the distance based on the above-mentioned reference, said measured value is, in other words, levitation distance e. Furthermore, in the case object 17 is made of metal, by obtaining mutual electrical continuity by applying current between object 17 in the non-levitated state and vibrator 11, the point at which object 17 was levitated was confirmed as the point at which this continuity was interrupted and a non-continuity state was entered.

In this experiment, the test pieces having the various forms shown in FIGS. 18 through 24 were made available, and levitation distance was measured for these test pieces.

Figure 18:
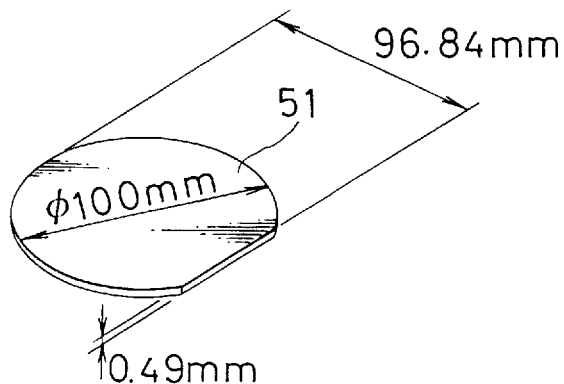
FIG. 18 is a perspective view of a test piece for measurement by the measuring apparatus shown in FIG. 17.
Figure 19:
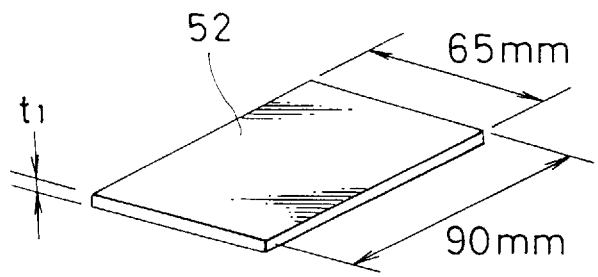
FIG. 19 is a perspective view of a test piece for measurement by the measuring apparatus shown in FIG. 17.
Figure 20:
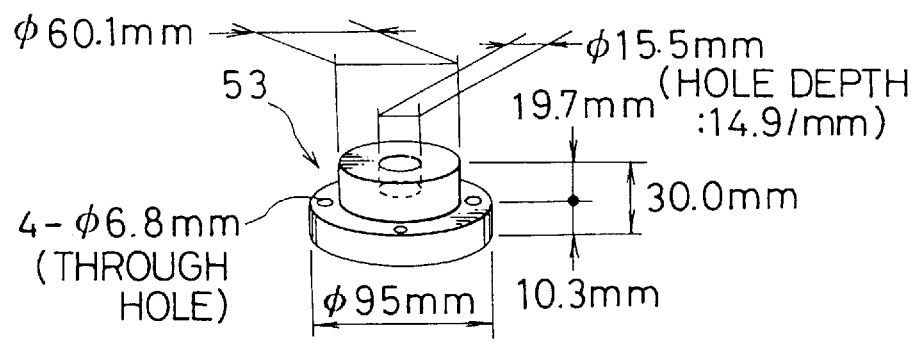
FIG. 20 is a perspective view of a test piece for measurement by the measuring apparatus shown in FIG. 17.

Test piece 51 shown in FIG. 18 is a silicon wafer as the primary product during manufacturing of semiconductors (IC chips), and that having a diameter of roughly 100 mm (4 inches) was selected for the experiment. In addition, test piece 52 shown in FIG. 19 is a rectangular plate made of Bakelite and formed to the dimensions shown in the drawing. However, in this FIG. 19, the reason the thickness of test piece 52 is indicated with symbol $t_1$ instead of the actual dimension is that a plurality of test pieces 52, in this case eight, were used in the experiment and the thickness of each differed. Each of these eight test pieces is indicated with reference numerals 52a through 52h in Table 2 below together with each of their thicknesses. Furthermore, although each of test pieces 52a through 52h is made of Bakelite, their respective specific weights are different.

Figure 21:
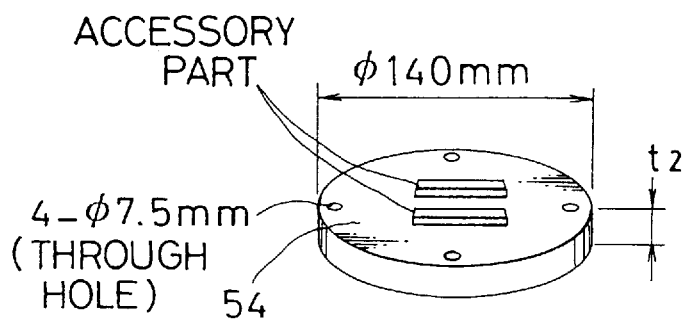
FIG. 21 is a perspective view of a test piece for measurement by the measuring apparatus shown in FIG. 17.
Figure 22:
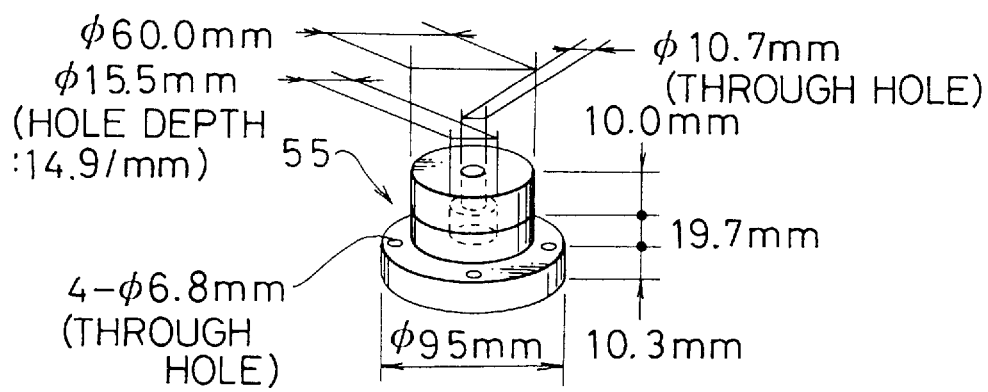
FIG. 22 is a perspective view of a test piece for measurement by the measuring apparatus shown in FIG. 17.
Figure 23:
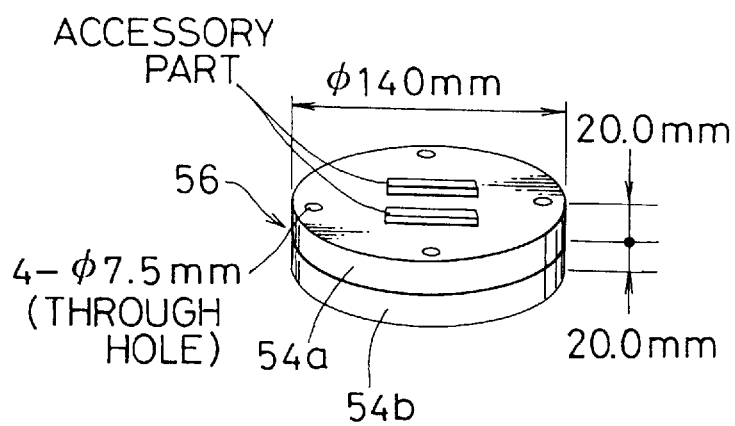
FIG. 23 is a perspective view of a test piece for measurement by the measuring apparatus shown in FIG. 17.
Figure 24:
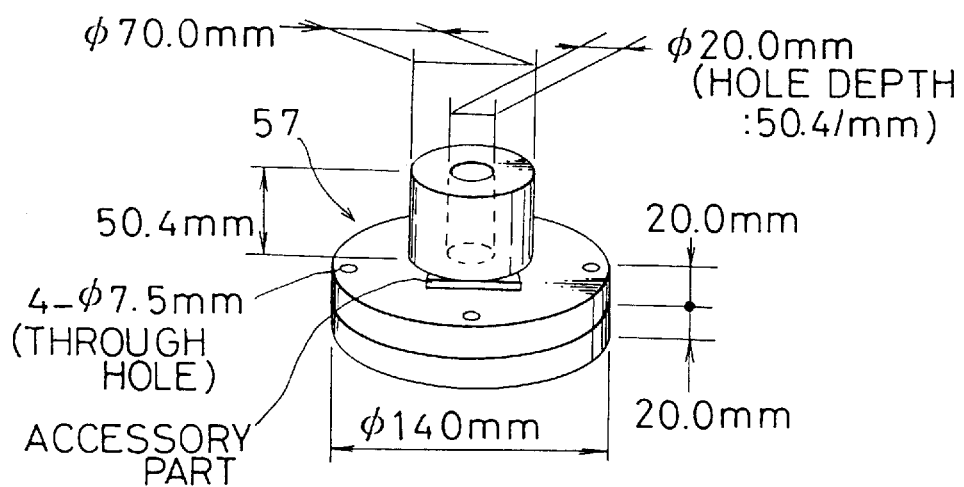
FIG. 24 is a perspective view of a test piece for measurement by the measuring apparatus shown in FIG. 17.

Next, each of test pieces 53 through 57 shown in FIGS. 20 through 24 are made of duralumin and are formed to the dimensions shown in each drawing. However, the reason the thickness of test piece 54 is indicated with symbol $t_2$ in FIG. 21 is that two test pieces 54 were used in the experiment and these two test pieces have mutually different thicknesses. In addition, test piece 56 shown in FIG. 23 consists of two test pieces coupled together. These two test pieces are indicated with reference numerals 54a and 54b, respectively, in FIG. 23.

The weights along with the values resulting from dividing said weight by bottom surface area are shown in Table 1 below for each of the test pieces mentioned above.

TABLE 1

| Test Piece | | Weight (g) | Weight per unit surface area ($g/cm^2$) | Levitation distance ($\mu m$) |
|---|---|---|---|---|
| 51 | | 8.7 | 0.111 | 445 |
| | 52a | 79.3 | 1.36 | 55 |
| | 52b | 39.6 | 0.68 | 164 |
| | 52c | 38.1 | 0.65 | 50.5 |
| 52 | 52d | 23.7 | 0.407 | 197 |
| | 52e | 15.0 | 0.258 | 237 |
| | 52f | 11.8 | 0.203 | 287 |
| | 52g | 7.6 | 0.131 | 469 |
| | 52h | 7.8 | 0.134 | 346 |
| 53 | | 344 | 4.96 | 57.0 |
| 54 | 54a | 920 | 6.05 | 48.3 |
| | 54b | 1000 | 6.67 | 66.0 |
| 55 | | 556 | 8.02 | 61.3 |
| 56 | | 1900 | 12.5 | 42.0 |
| 57 | | 3260 | 21.4 | 35.5 |

TABLE 2

| Test Piece | Thickness (mm) | Test Piece | Thickness (mm) |
|---|---|---|---|
| 52a | 10.2 | 52e | 2.0 |
| 52b | 5.1 | 52f | 1.6 |
| 52c | 4.9 | 52g | 1.0 |
| 52d | 3.1 | 52h | 1.1 |

Figure 25:
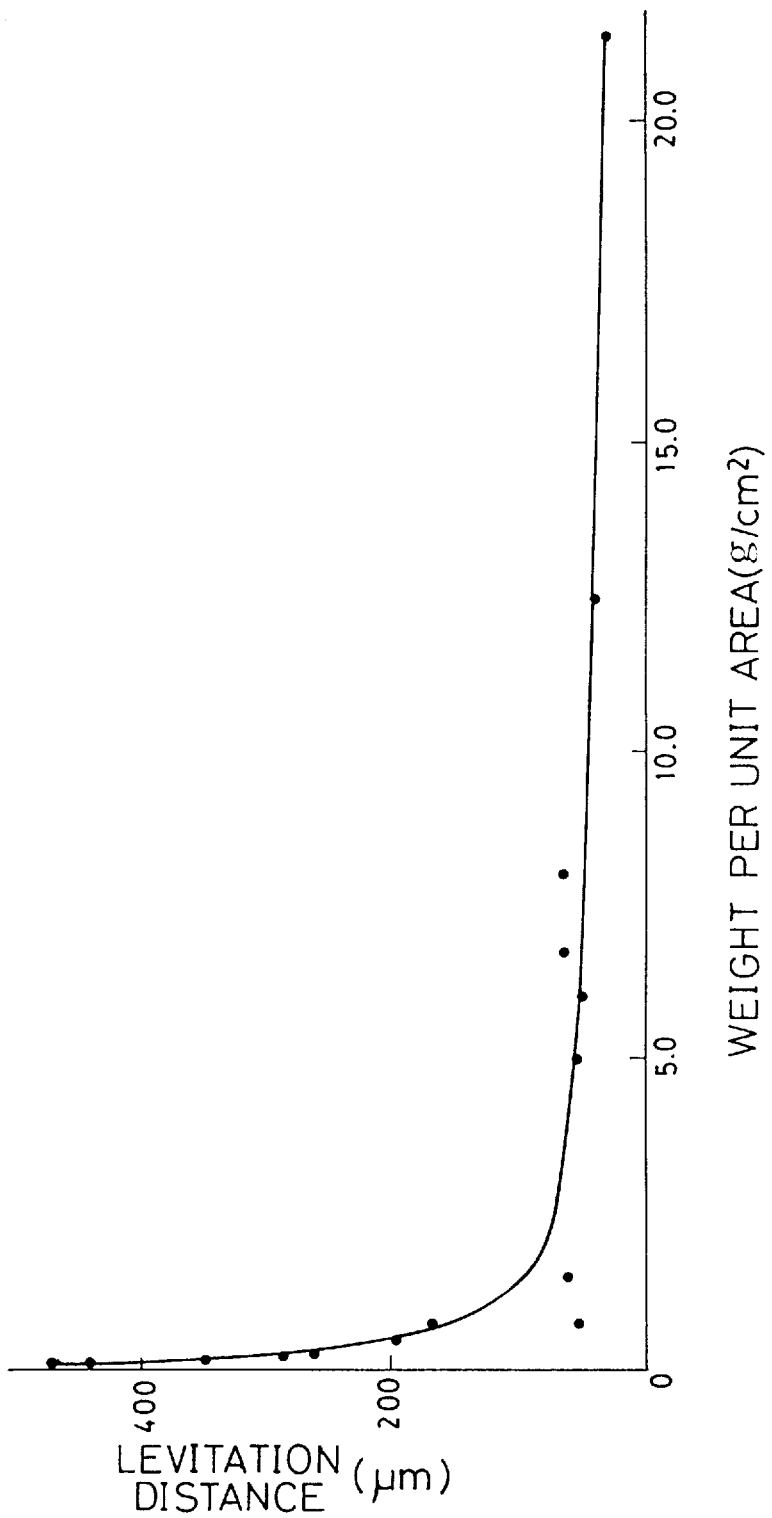
FIG. 25 is a graph showing the measurement results obtained from the measuring apparatus shown in FIG. 17.

The levitation distances measured for each test piece are shown in Table 1 above. FIG. 25 is a graph which shows the relationship between weight per unit surface area and levitation distance for each test piece. It was determined from this graph that weight per unit surface area and levitation distance are inversely proportional. However, as is clear from said graph, when the weight per unit surface area becomes considerably large, the rate of change in levitation distance becomes smaller.

Figure 26:
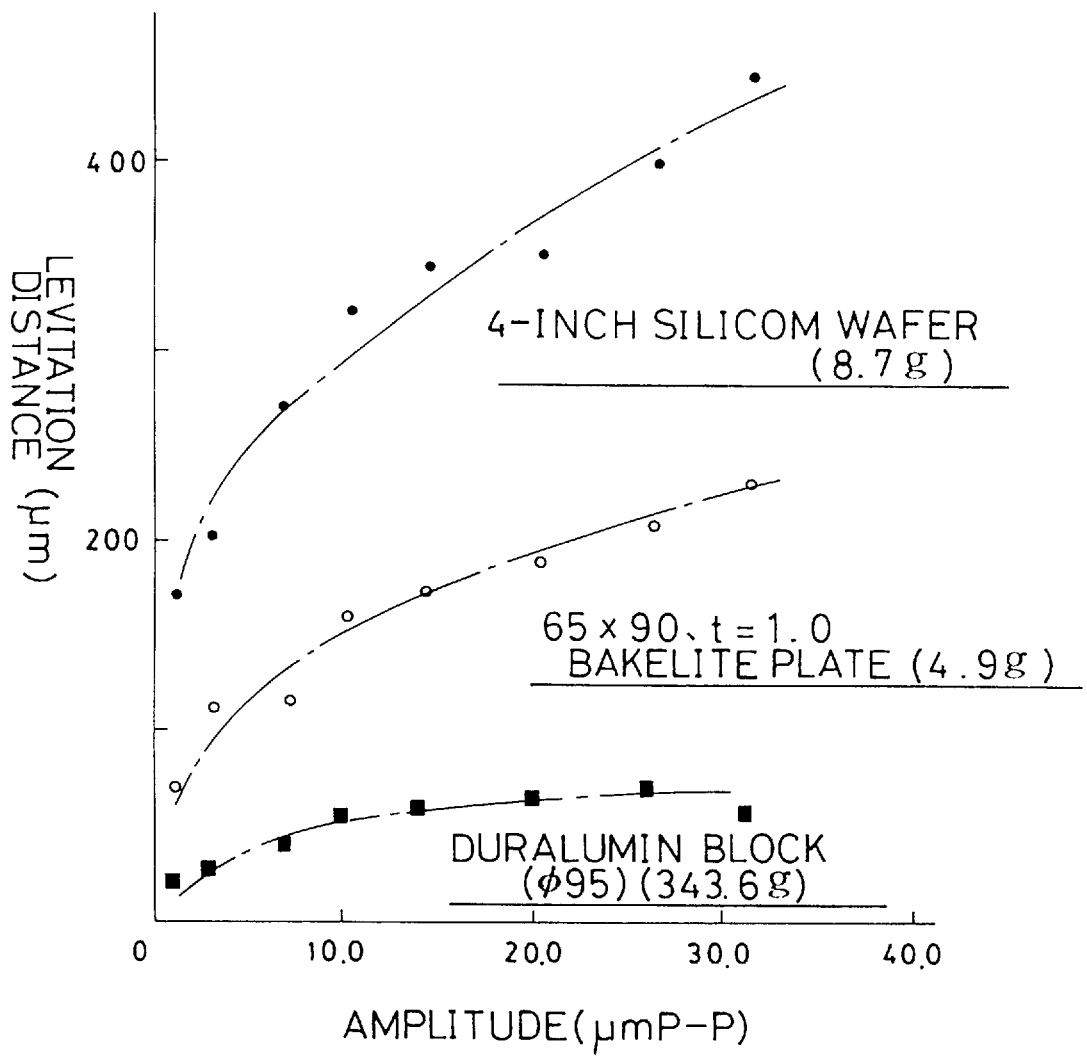
FIG. 26 is a graph showing the measurement results obtained from the measuring apparatus shown in FIG. 17.

Continuing, three test pieces, namely test piece 51, 52c and 53, were selected from the above-mentioned test pieces. While changing the amplitude of vibrator 11, levitation distance was measured for each of these test pieces at each amplitude. Furthermore, the changes in amplitude were set to 8 levels, and each amplitude value was checked using a dial gauge not shown. The results of these measurements are shown in Table 3 below. FIG. 26 is a graph which shows the relationship between each amplitude and its corresponding levitation distance. As is clear from this graph, although amplitude and levitation distance are proportional, when the amplitude value reaches a certain level, saturation occurs and levitation distance does not exceed a certain amount. This is assumed to be the result of radiation pressure of the sound waves escaping when levitation distance increases, thus resulting in a decrease in levitation efficiency.

TABLE 3

| | Test Piece | | |
|---|---|---|---|
| Amplitude ($\mu$m) | 41 | 42c | 43 |
| 32 | 445 ($\mu$m) | 231.3 ($\mu$m) | 57.0 ($\mu$m) |
| 26 | 397 | 208 | 72.6 |
| 20 | 353 | 192 | 63.9 |
| 14 | 346 | 178 | 59.3 |
| 10 | 299 | 158.7 | 54.0 |
| 7 | 270 | 116.6 | 39.3 |
| 3 | 203 | 110 | 24.9 |
| 1 | 173.3 | 71.6 | 20.0 |

Figure 27:
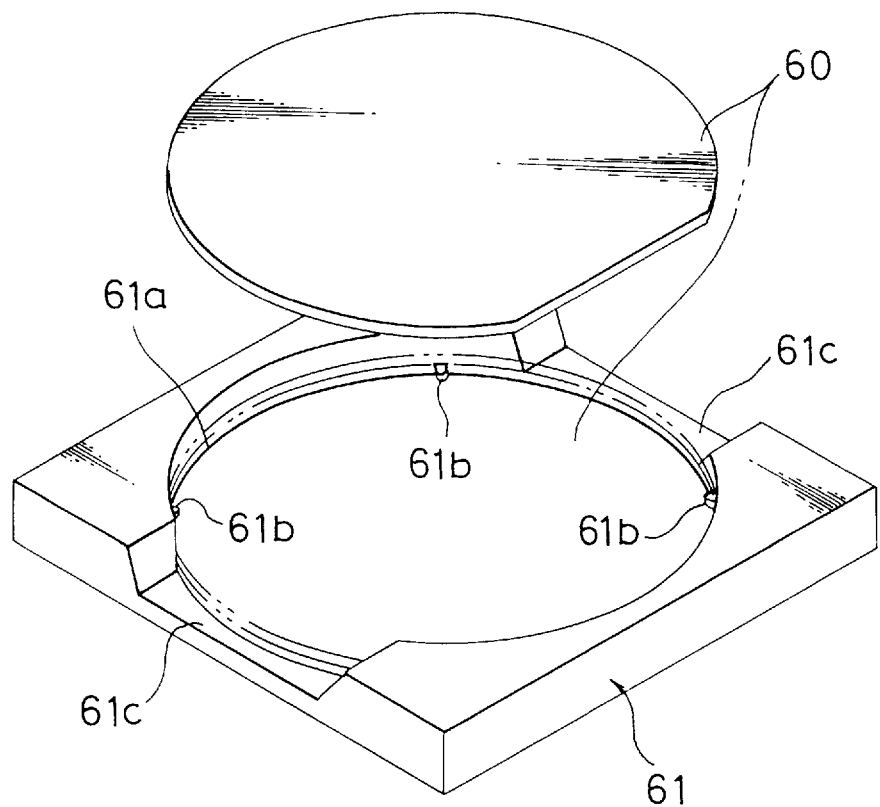
FIG. 27 is a perspective view of a silicon wafer to be transported by the object transporting apparatuses of each embodiment shown in FIGS. 2 through 14, and the carrier on which said silicon wafer is loaded.

Although the explanation provided thus far is based on the results of selecting various types of objects as test pieces performing levitation experiments using the prototype of an object levitating apparatus on each of these objects, the constitution shown in FIG. 27 has been conceived as an example of practical application.

In this constitution, the object to be transported is silicon wafer 60, the primary product during manufacture of semiconductors (IC chips). Said silicon wafer 60 is loaded on carrier 61, formed into the shape of, for example, a rectangular plate, followed by levitation and transport by the object transporting apparatus described above.

As is clear from this drawing, circular indentation 61a, for insertion of roughly circular silicon wafer 60, is provided in carrier 61. A plurality of, for example four, projections 61b are formed at equal intervals on the inside surface of this indentation 61a, and silicon wafer 60 is loaded on these projections 61b within indentation 61a. Notches 61c, continuous with indentation 61a, are formed on both sides of carrier 61. These notches 61c have a certain depth which results in the formation of a prescribed gap between the bottom surfaces of said notches 61c and the lower surface of silicon wafer 60 when silicon wafer 60 is loaded on said projections 61c. Namely, when a robot hand and so forth not shown inserts or takes out this silicon wafer 60 within indentation 61a, silicon wafer 60 can be grabbed through the above-mentioned notches 61c.

Furthermore, silicon wafer 60 can also be transported directly without using said carrier 61.

Figure 28:
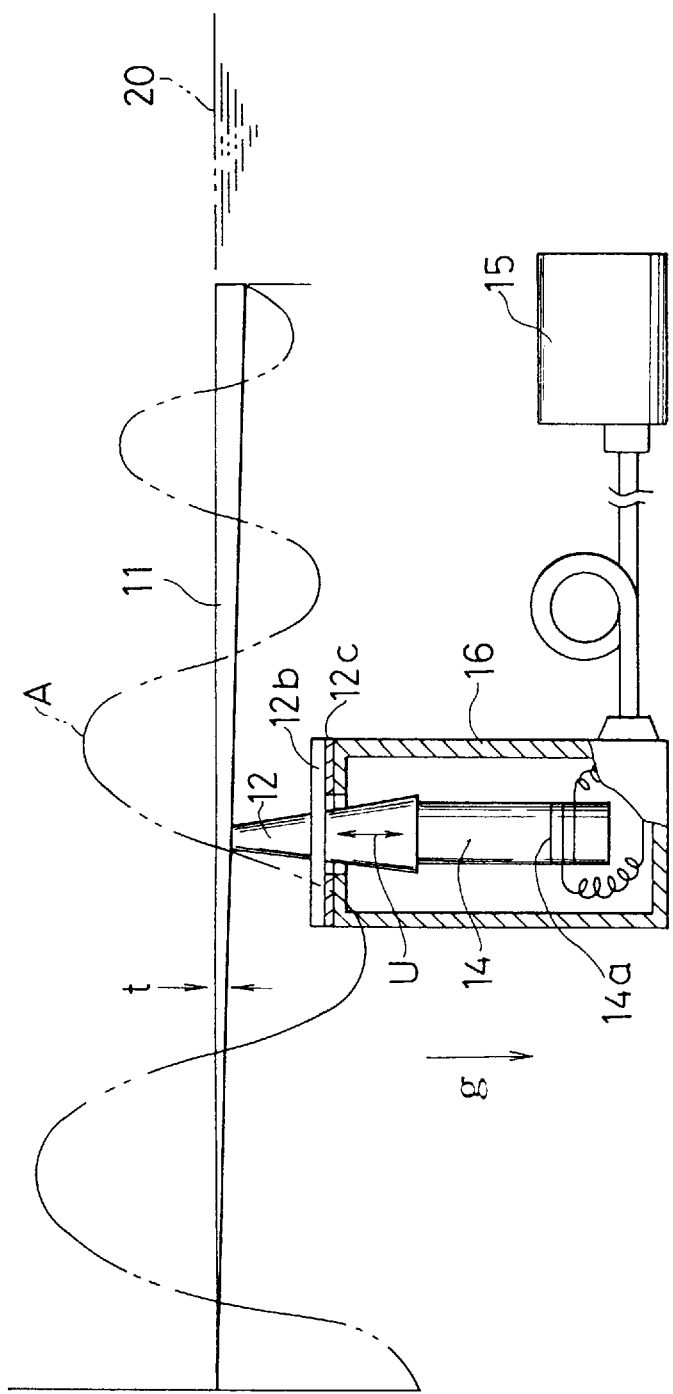
FIG. 28 is a front view of the essential portion of an object transporting apparatus as an eighth embodiment of the present invention.

FIG. 28 shows the essential portion of an object transporting apparatus as an eighth embodiment of the present invention.

As shown in FIG. 28, in this object transporting apparatus, thickness t of vibrator 11 on the side of horn 12 is gradually and uniformly increased along the direction of transport of object 17 with respect to hypothetical horizontal plane 20 as a means of travel for object 17. When this type of vibrator 11 is vibrated in the direction of its thickness by an ultrasonic excitation device, since a vibration mode is produced wherein the amplitude at the vibration site where plate thickness is thin is large, and that at the vibration site where plate thickness is thick is small as shown in FIG. 28, driving force is applied to object 17 in the direction from the site where the thickness of the vibrator is thin to the site where the thickness of vibrator 11 is thick due to the difference in sound pressure produced by vibration amplitude, thus resulting in travel of object 17.

Furthermore, in addition to the ratio of change of the thickness of vibrator 11 being uniform as shown in the example of the above-mentioned FIG. 28, thickness can also be changed according to the transport conditions of object 17.

Figure 29:
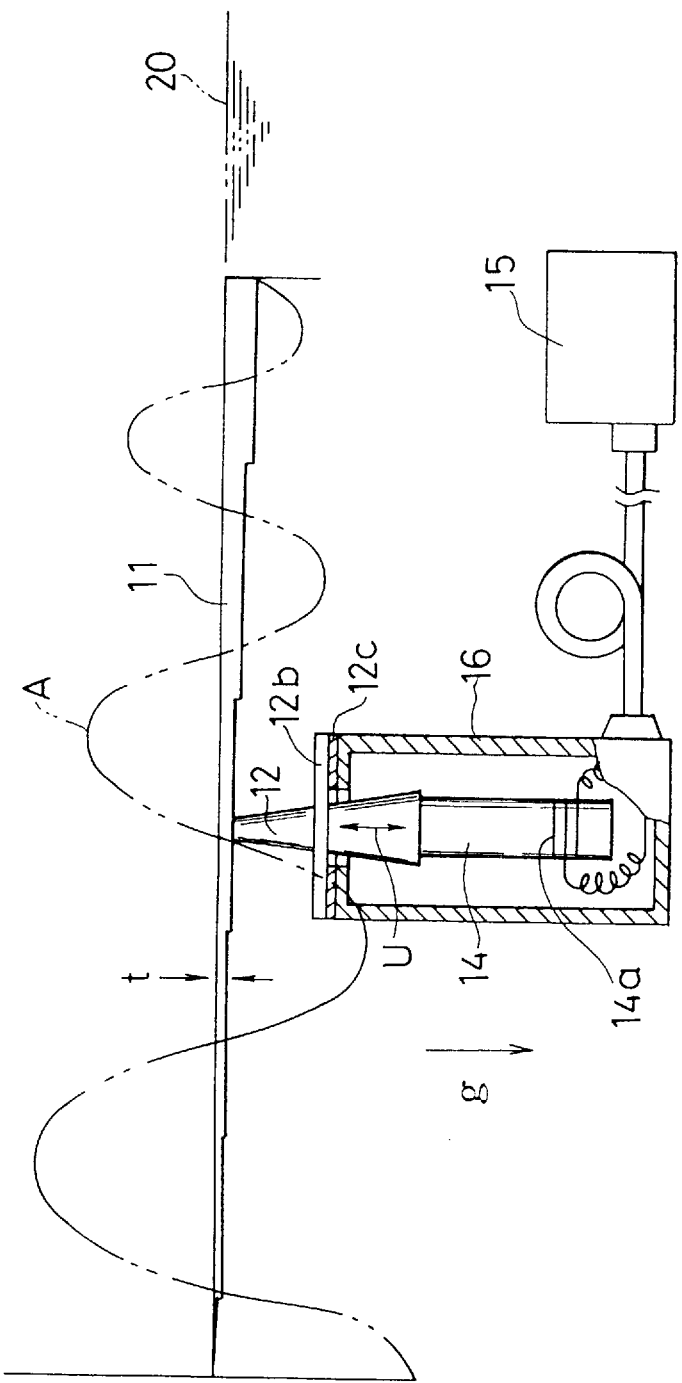
FIG. 29 is a front view of the essential portion of an object transporting apparatus as a ninth embodiment of the present invention.

FIG. 29 shows the essential portion of an object transporting apparatus as a ninth embodiment of the present invention.

As shown in FIG. 29, in this object transporting apparatus, the shape of vibrator 11 in the object transporting apparatus shown in the above-mentioned FIG. 28 is further changed to serve as the means for travel of object 17. Namely, one side of vibrator 11 on the side of horn 12 is formed into the shape of steps with respect to hypothetical horizontal plane 20 in order to gradually change thickness t of vibrator 11. As a result, the vibration mode can be controlled in the manner of so-called digital control. In addition, similar to the vibrator 11 of FIG. 28, since a vibration mode is obtained wherein vibration amplitude gradually becomes smaller in the direction from the site where thickness t of vibrator 11 is thin to the site where it is thick, driving force is obtained in the same manner due to the difference in sound pressure. Furthermore, the ratio of the stepwise change of the thickness of the vibrator can be suitably set as desired in consideration of the shape of vibrator 11 or the transporting conditions of object 17. Alternatively, both sides of vibrator 11 may be formed in the shape of steps.

Figure 30:
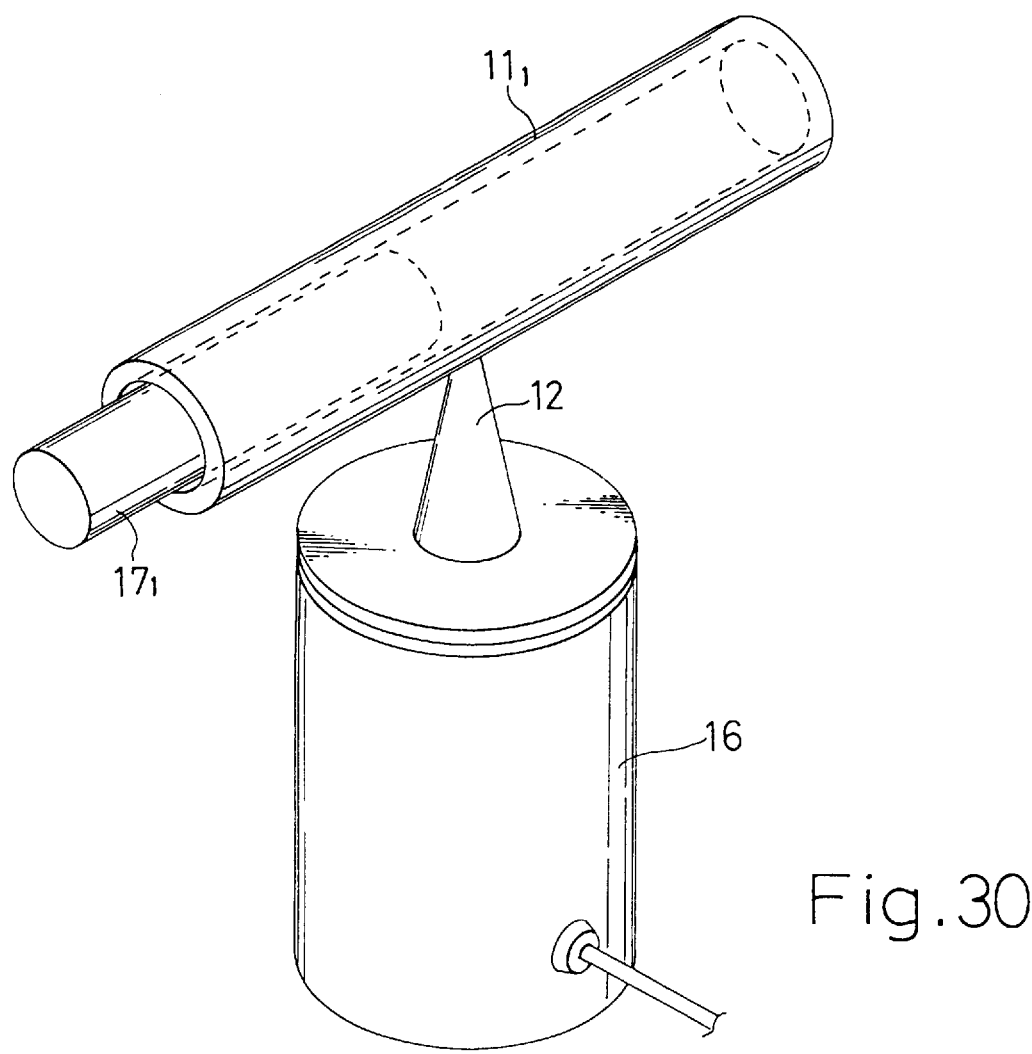
FIG. 30 is a perspective view of the essential portion of an object transporting apparatus as a tenth embodiment of the present invention.
Figure 31A:
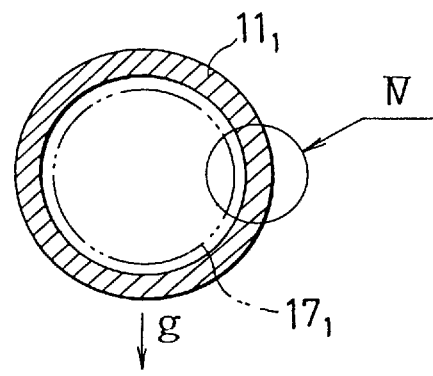
FIG. 31(*a*) is an explanatory diagram of the vibration mode in the object transporting apparatus of FIG. 30, while FIG. 31(*b*) is an enlarged view of the section indicated with arrow IV.
Figure 31B:
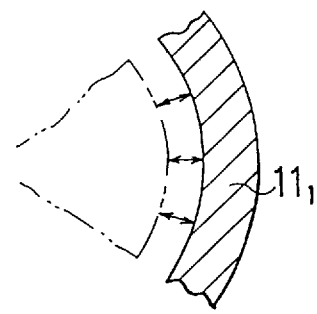
Figure 32A:
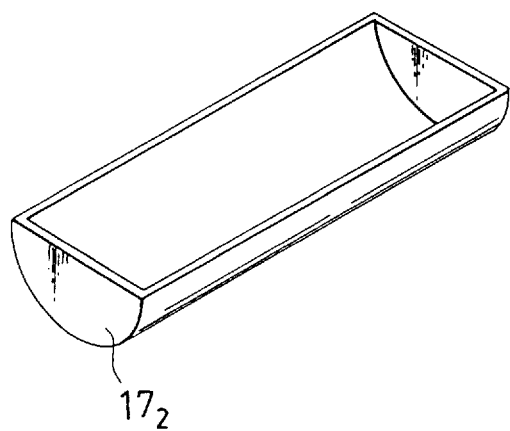
FIGS. 32(*a*), 32(*b*), 32(*c*) and 32(*d*) are perspective views showing examples of objects levitated using the object transporting apparatus of FIG. 30.
Figure 32B:
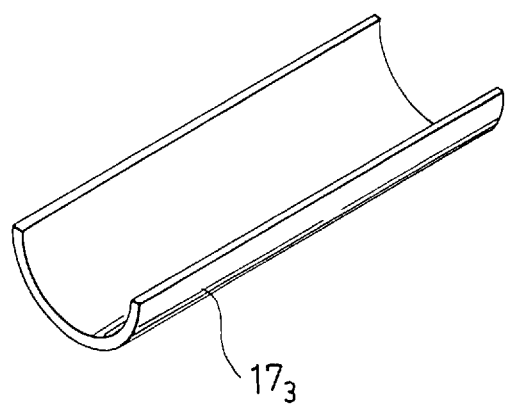
Figure 32C:
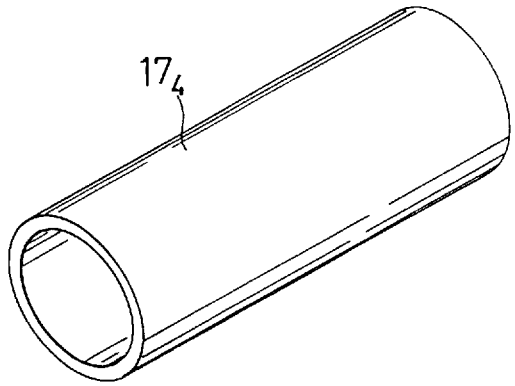
Figure 32D:
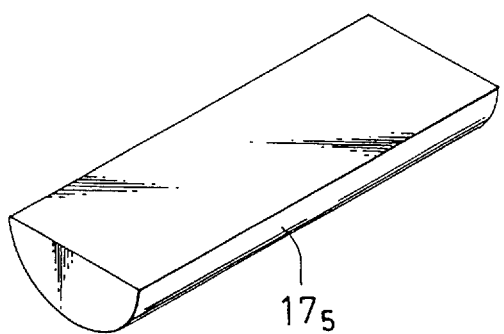

FIG. 30 shows an object levitating apparatus as a tenth embodiment of the present invention. In said embodiment, vibrator 11 composed of a cylindrical 11 member is fastened to the end of horn 12 of an ultrasonic excitation device with a screw and so forth. This cylindrical member in the form of vibrator 11 is coupled so that its axial direction is roughly perpendicular to the vibrating direction (longitudinal vibration) of horn 12, and as a result of vibrations being applied to this cylindrical member $11_1$a vibration mode is generated within this cylindrical member in the radial direction towards the center of the inside of said cylindrical member as shown in FIG. 31(a). The sound pressure produced by this vibration mode is roughly equal in the radiating direction, and object $17_1$ in the form of the levitated object inserted into the cylindrical member, namely a column-shaped shaft, is levitated without making contact with the inside of the cylindrical member as shown in FIG. 31(b).

FIG. 32 shows various examples of different shapes of levitated object $17_1$ of the above-mentioned object levitating apparatus. FIG. 32(a) indicates object $17_2$ composed of a board-shaped member, the bottom surface of which is in the shape of a semi-circle and the side surface of which is blocked with a side plate. FIG. 32(b) indicates object $17_3$ composed with a semi-cylindrical member. FIG. 32(c) indicates object $17_4$ composed of a thin-walled cylindrical member. FIG. 32(d) indicates object $17_5$ composed of a semi-circular column member. Even in the case of these objects of various shapes, these objects are levitated within cylindrical member $11_1$ as shown in FIGS. 31(a) and 31(b) by the radiation pressure of sound waves received from the inner bottom surface of vibrator 11 in the form of this cylindrical member.

Figure 33:
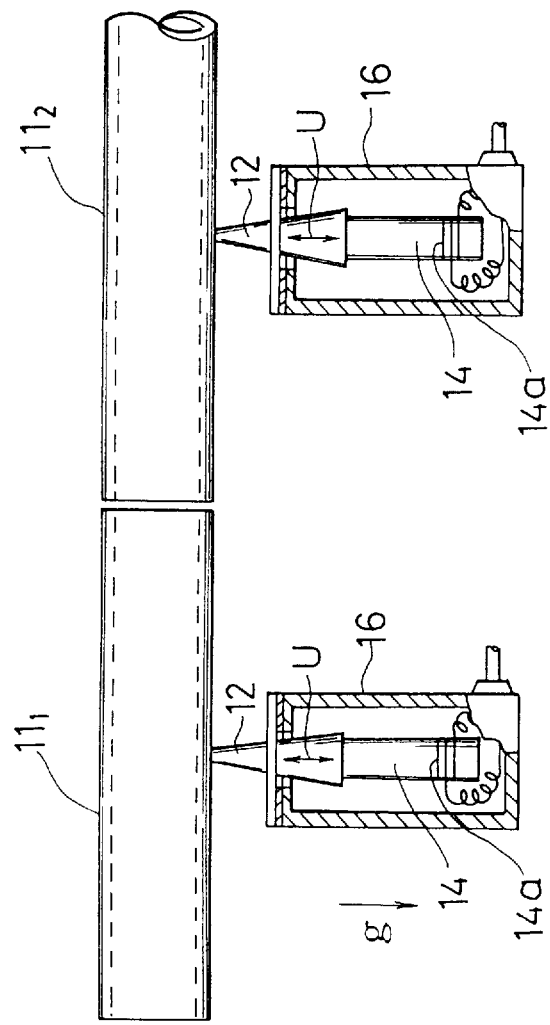
FIG. 33 is a front view showing a plurality of the object transporting apparatuses of FIG. 30 arranged in a row.

FIG. 33 shows a plurality of the above-mentioned object levitating apparatuses arranged in a row. As shown in the drawing, as a result of vibrators in the form of cylindrical members $11_1$ and $11_2$ being serially arranged in the axial direction, object 17 can be levitated and transported by forming a transport path of a desired length.

In the above-mentioned object levitating apparatus, objects $17_1$ through $17_n$ can be transported in the axial direction within cylindrical members $11_1$ and $11_2$ by using, although not shown, the embodiments shown in FIGS. 2 through 29 for the traveling device of levitated objects $17_1$ through $17_n$. This means that, for example, the apparatus itself should be inclined as in the embodiment shown in FIG. 7, air should be blown in the direction of the inside of the above-mentioned cylindrical members $11_1$ and $11_2$ as in the embodiment shown in FIG. 8, or the radiation pressure of sound waves should be applied to the inside of cylindrical members $11_1$ and $11_2$ as shown in FIG. 9. In these cases, since objects $17_1$ through $17_n$ are levitated, they are transported with only a slight applied force.

Figure 34:
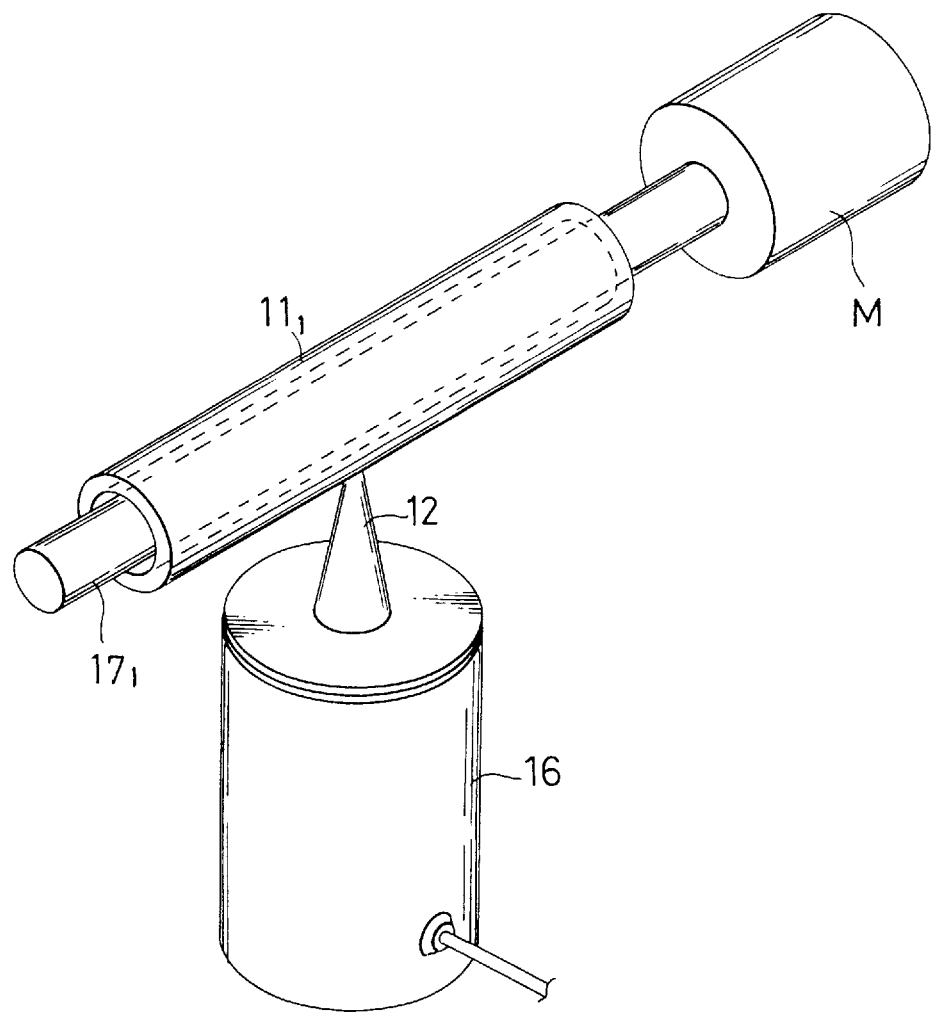
FIG. 34 is a perspective view showing an object transporting apparatus as an eleventh embodiment of the present invention used as an object levitating bearing.

Next, FIG. 34 shows an apparatus as an eleventh embodiment of the present invention. Said apparatus is in the form of an object levitating bearing which connects a drive device in the form of motor M, which applies turning force to a levitated object in the form of columnar shaft $17_1$, to one end of said shaft. Although this object levitating bearing directly connects columnar shaft $17_1$, it may also connect said shaft $17_1$ by means of other coupling devices. Alternatively, said shaft $17_1$ may naturally also be driven by means of a drive force transmission member, including a drive device, on the other end. In addition, a plurality of these object levitating bearings shown in FIG. 34 may be arranged as shown in FIG. 33. By doing this, the load of the bearing can be increased.

In addition, in the object levitating apparatuses and object levitating bearings shown in FIGS. 30, 33 and 34, since objects $17_1$ through $17_n$ are enclosed within cylindrical members $11_1$ and $11_2$, and are levitated from the peripheral walls, a particular transport path deviation prevention device is not required.

Figure 35:
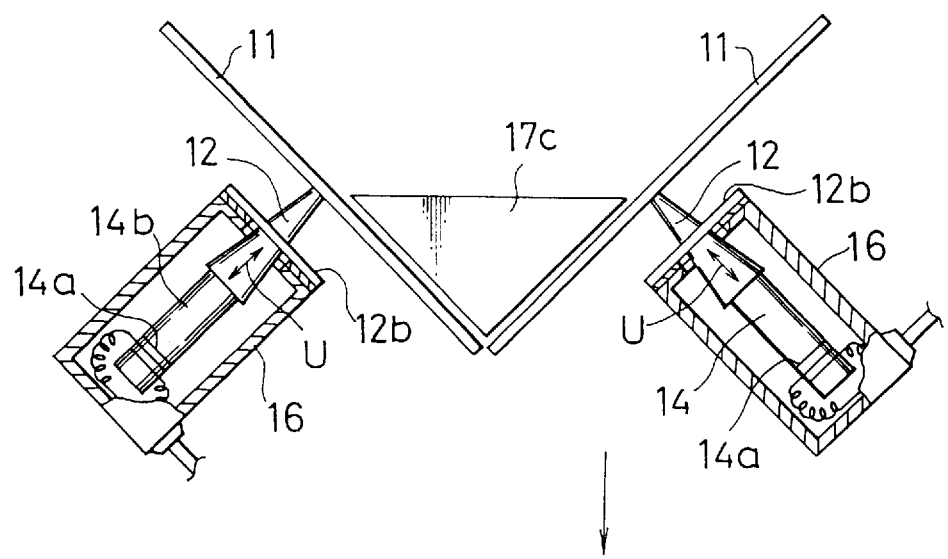
FIG. 35 is a cross-sectional view of the essential portion of an object levitating apparatus as a twelfth embodiment of the present invention.

FIG. 35 shows the essential portion of an object levitating apparatus as a twelfth embodiment of the present invention. This object levitating apparatus provides one pair of an object levitating apparatus like that shown in the above-mentioned FIG. 2 coupled to the end of horn 12 of an ultrasonic excitation device so that hypothetical plane of flat plate-shaped vibrator 11 is perpendicular to the vibrating direction U of horn 12. In the present embodiment, the vibrating surface of each vibrator 11 is arranged to mutually form roughly the shape of the letter "V". Thus, object 17c arranged within these vibrators 11 is subjected to the levitating force produced by the radiation pressure of sound waves radiated from each vibrator 11, and is levitated in a state separated from each vibrator 11 as shown in FIG. 35 by their combined force. At this time, levitated object 17c is subjected to the force in the horizontal direction (right and left directions in FIG. 35) which reciprocates from vibrators 11 on both sides. As a result of that balance, levitated object 17c is supported in the horizontal direction and levitated without making contact with the surfaces of vibrators 11 on both sides.

In addition, although it is desirable that levitated object 17c has a roughly V-shaped cross-section having parallel surfaces in opposition to the surfaces of vibrators 11 as shown in FIG. 35, said levitated object 17c is not necessarily specified to have this shape.

FIG. 36 shows a plurality of the above-mentioned object levitating apparatuses arranged in a row. When vibrators 11 are consecutively arranged along a straight line as shown in the drawing, object 17c of a desired length can be easily levitated and supported.

Figure 37A:
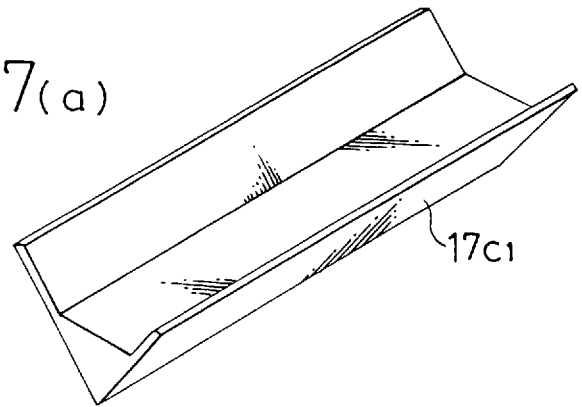
FIGS. 37(*a*), 37(*b*) and 37(*c*) are perspective views showing examples of objects levitated using the object levitating apparatus of FIG. 35.
Figure 37B:
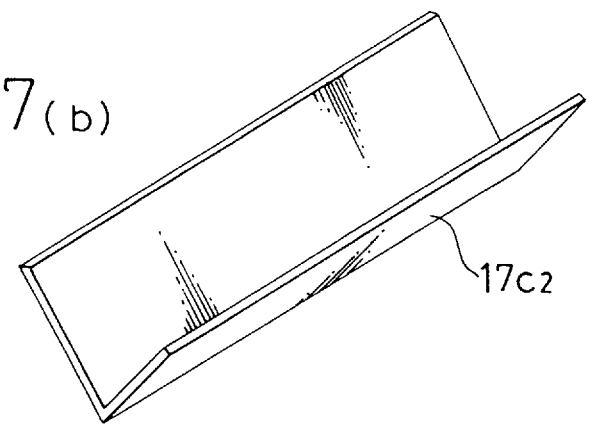
Figure 37C:
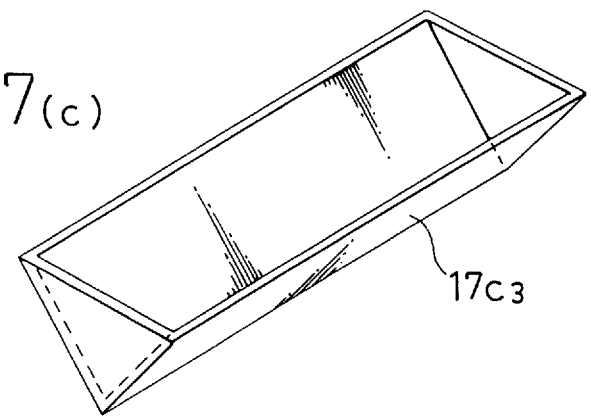

FIG. 37 shows examples of variations of object 17c suitable for being levitated by the above-mentioned object levitating apparatus. Although each of FIGS. 37(a) through 37(c) show objects having roughly V-shaped cross-sections having parallel surfaces in opposition to the surfaces of vibrators 11, these are suitable in the case of using object 17c as a board for holding or transporting another object. FIG. 37(a) shows object $17c_1$ equipped with a flat inner bottom surface advantageous for loading an object, FIG. 37(b) shows object $17c_2$, in which a flat plate is bent in roughly the shape of the letter "V", and FIG. 37(c) shows object $17c_3$ composed to demonstrate the function of a containment vessel in which the front end and rear end of the object of FIG. 37(b) are blocked. These FIGS. 37(a) through 37(c) merely indicate one example, and levitated object 17c can be used while suitably changing its shape.

In the above-mentioned object levitating apparatus, levitated object 17c can be made to travel by using, although not shown, the embodiments shown in FIGS. 2 through 29 for the traveling device of levitated object 17c for the traveling device of levitated object 17c. This means that, for example, the apparatus itself should be inclined as in the embodiment shown in FIG. 7, air should be blown as shown in FIG. 8, or the radiation pressure of sound waves should be applied as shown in FIG. 9. In the present invention of this type, it goes without saying that object 17c can be transported along a roughly V-shaped transport path composed with a pair of vibrators 11 if various traveling devices are used appropriately. Furthermore, since the pair of opposing vibrators 11 also fulfill the role of transport guides for object 17c as previously described, deviation from the transport path is prevented.

Continuing, the following provides an explanation of an object transporting apparatus as a thirteenth embodiment of the present invention based on FIGS. 38 through 41.

Figure 39:
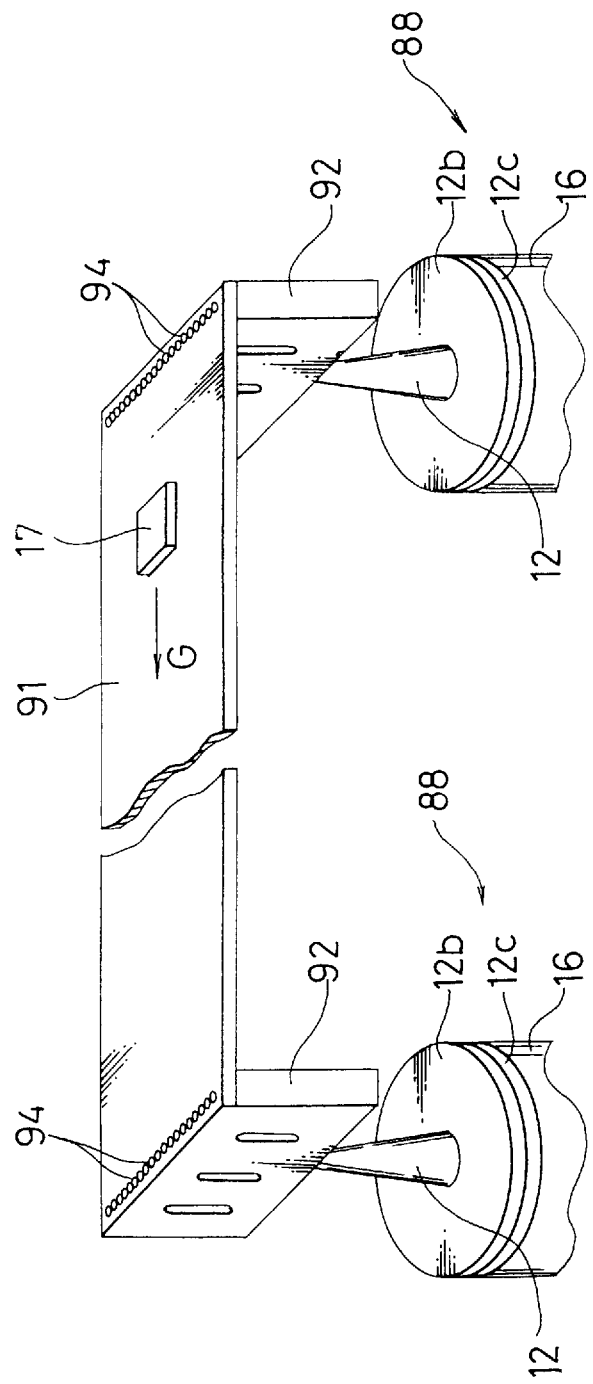
FIG. 39 is a perspective view, including a partial cross-section, of the object transporting apparatus shown in FIG. 38.
Figure 40:
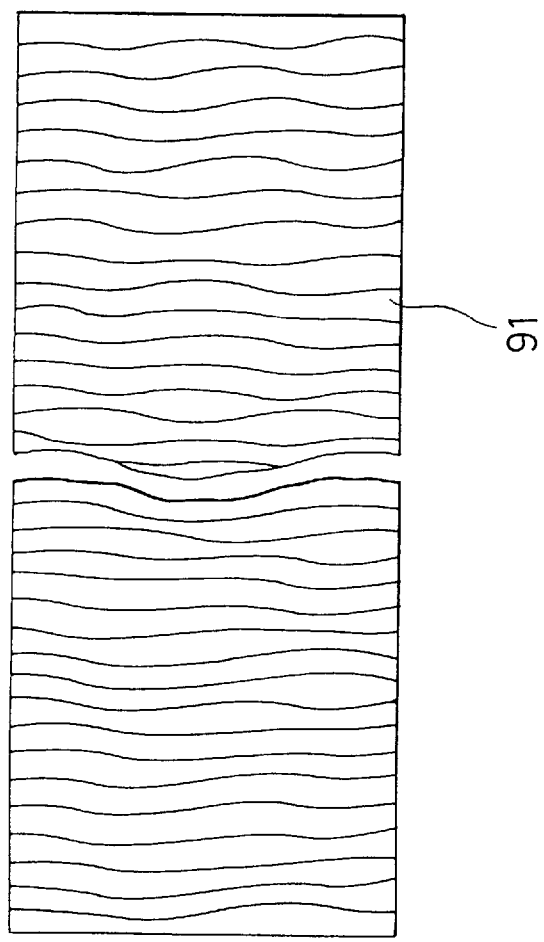
FIG. 40 is an overhead view of a vibrator equipped on the object transporting apparatus shown in FIGS. 38 and 39.

As shown in FIGS. 38 and 39, two ultrasonic vibration generation units 88, each including horn 12, oscillator 14 and case 16, are proviand case 16, are provided in said object transporting apparatus. Each ultrasonic vibration generation unit 88 composes generator 15 to be described later and an ultrasonic excitation device.

As shown in the drawings, said object transporting apparatus is equipped with a rectangular plate-shaped primary vibrator 91 for levitating object 17 above its surface, and auxiliary vibrator 92 juxtapositioned between said primary vibrator 91 and excitation horn 12. Primary vibrator 91 is made of duralumin, and has dimensions of, for example, length L of 695 mm, breadth B of 220 mm and thickness t of 3 mm. In addition, a plate-shaped horn, designed so that vibrations are uniformly distributed over its end surface in finite element analysis, is used for auxiliary vibrator 92, and together with being fastened to the end of the above-mentioned horn 12 at its lower end, is fastened to one side of the above-mentioned primary vibrator 91 using a large number of screws 94 (shown in FIG. 39). Furthermore, in addition to using screws in the manner described above, coupling of primary vibrator 91 to auxiliary vibrator 92 may also be performed using adhesive, soldering, welding and so forth. In addition, this applies similarly with respect to the means for coupling auxiliary vibrator 92 to horn 12.

In the object transporting apparatus of said constitution, primary vibrator 91 vibrates in a banded vibration mode based on the longitudinal vibrations transmitted through horn 12. The results shown in FIG. 40 were obtained when this vibration mode was measured using Chladni's sand figures. According to this constitution as well, object 17 is levitated above the surface of primary vibrator 91. In the case of this banded vibration mode, reciprocating travel of object 17 to be described later is performed smoothly. In addition, since primary vibrator 91 is in the form of a flat plate, an effective banded vibration mode is produced.

Figure 41:
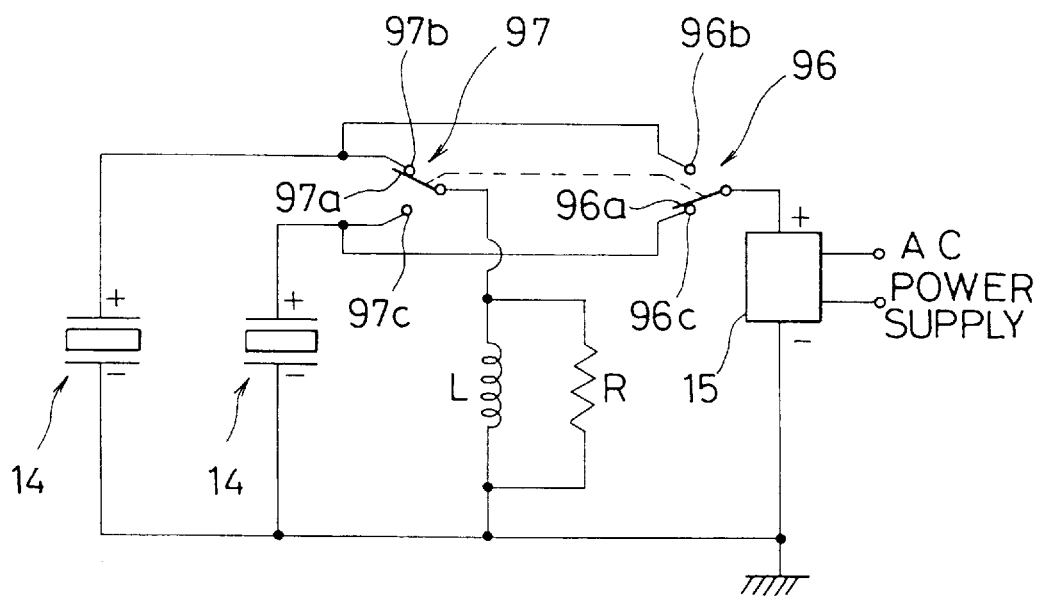
FIG. 41 is a circuit diagram of the operation control system of the object transporting apparatus shown in FIGS. 38 through 40.

A single generator is provided for the respective oscillators 14 of both the above-mentioned ultrasonic vibration generation units 88, and these are connected as shown in FIG. 41.

In FIG. 41, both of the above-mentioned oscillators 14 are arranged in parallel, and the cathodes of both are grounded. In addition, the cathode is grounded for generator 15 as well. The anode of generator 15 is connected to switch 96*a* of relay 96. Together with one terminal 96*b* of this relay 96 being connected to one terminal 97*b* of the other relay 97, it is also connected to the anode of one oscillator 14. In addition, together with the other terminal 96*c* of relay 96 being connected to the other terminal 97*c* of said relay 97, it is also connected to the anode of the other oscillator 14. One end each of coil L and resistor R, provided in parallel, is connected to switch 97*a* of this relay 97, and the other ends of said coil L and resistor R are grounded. As shown in the drawing, switches 96*a* and 97*a* of both relays 96 and 97 are mutually linked.

Said constitution operates in the manner described below.

For example, in the case switches 96*a* and 97*a* of both relays 96 and 97 shown in FIG. 41 respectively make contact with terminals 96*c* and 97*b* of both of said relays as shown in the same drawing, the above-mentioned primary vibrator 91 vibrates in a banded vibration mode due to vibrations emitted by one oscillator 14. At the same time, this vibration is transmitted to the other oscillator 14, where ultrasonic energy in the form of mechanical energy is converted into electrical energy by said oscillator 14. As a result of this electrical energy passing through the circuit composed of coil L and resistor R, it is further converted into Joule heat and radiated. As a result, the vibration waves produced in primary vibrator 91 become progressive waves, and object 17 travels in a single direction as indicated with arrow G (see FIGS. 38 and 39) in the state of riding these progressive waves. More specifically, since electrical energy is consumed as a result of being converted into Joule heat at resistor R, and coil L demonstrates the action of matching this conversion energy as a result of its inductance, electrical energy is created at the level of maximum efficiency.

On the other hand, when switches 96*a* and 97*b* of both of the above-mentioned relays 96 and 97 are switched to make contact with the other terminals 96*b* and 97*c* of both said relays, object 17 travels in the direction opposite that of arrow G. Namely, in FIG. 41, when one oscillator 14 is emitting ultrasonic energy, the other oscillator 14 acts as an energy conversion device which converts said ultrasonic energy into electrical energy allowing sound waves to become progressive waves by working in concert with the circuit composed of coil L and resistor R. This energy conversion device functions as a travel device that causes travel of object 17.

As described above, by providing a plurality of ultrasonic vibration generation units 88 in a row in the direction in which object 17 is to travel, and selectively performing energy conversion on the ultrasonic energy emitted by each of said ultrasonic vibration generation units 88, it is possible to cause object 17 to travel in reciprocating fashion.

Furthermore, although the above is an explanation only with respect to reciprocating motion of object 17, in the case of desiring to stop object 17 at a desired location, the following type of control is performed. However, this control is performed by the control circuit of a microcomputer and so forth not shown.

Namely, with respect to object 17 traveling in one direction, progressive waves are produced in the opposite direction until object 17 stops by switching the above-mentioned switches 96*a* and 97*a* so as to negate the inertial force of that travel. Once object 17 has nearly stopped, either the terminal on the passive side, namely the side of energy consumption, is opened, or the drive frequency of the driving side, namely the side of ultrasonic vibration generation, is changed to a different resonance point to stop object 17 completely.

Figure 42:
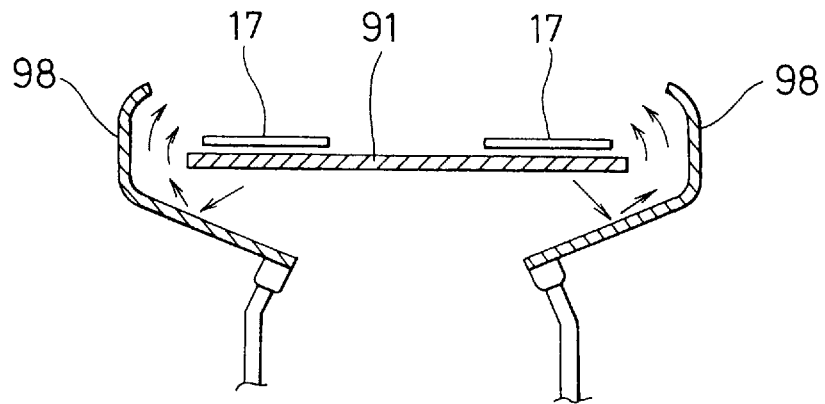
FIG. 42 is a longitudinal cross-sectional view of the essential portion of the object transporting apparatus shown in FIGS. 38 and 39.

However, in the above-mentioned object transporting apparatus, plate-shaped sound wave reflecting members 98 are provided along both sides of the transport path above primary vibrator 91 on which transport of object 17 is performed as shown in FIG. 42. However, these sound wave reflecting members 98 do not make contact with primary vibrator 91. When object 17 is transported in the manner described above, deviation from the transport path is prevented by the action of these sound wave reflecting members 98.

Namely, these sound wave reflecting members 98 reflect sound waves radiated from the lower surface of primary vibrator 91 as shown with the arrows in FIG. 42 while guiding said sound waves to the sides of the above-mentioned transport path. Since sound waves guided in this manner are present on the sides of the transport path, these sound waves serve as a wall which has the action of pushing back object 17 when it is about to deviate from the transport path. Accordingly, object 17 does not deviate from the transport path. In addition, according to said constitution, object 17 does not make contact with sound wave reflecting members 98. However, even if these sound wave reflecting members 98 are not provided, it has been confirmed that when object 17 is about to protrude from the edge of primary vibrator 91, it is pulled back to the inside by the action of sound waves radiating from said primary vibrator 91 itself.

The following describes examples of constitutions able to serve as other means for preventing deviation of object 17 from the transport path.

Figure 43:
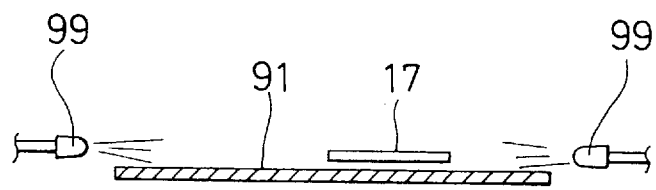
FIG. 43 is a longitudinal cross-sectional view showing a variation of a portion of the object transporting apparatus shown in FIGS. 38 through 42.
Figure 44:
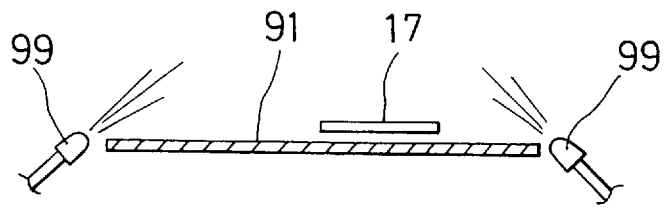
FIG. 44 is a longitudinal cross-sectional view showing a variation of a portion of the object transporting apparatus shown in FIGS. 38 through 42.

To begin with, as shown in FIGS. 43 and 44, air nozzles 99 are provided horizontally or inclined upward to form a wall by a pressurized gas, in this case compressed air, which is blown from each of said air nozzles 99.

Figure 45:
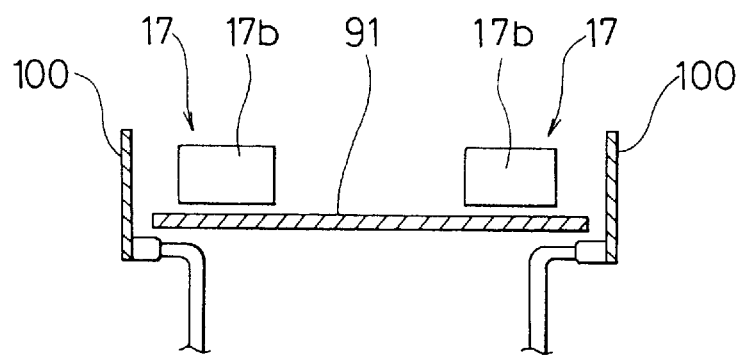
FIG. 45 is a longitudinal cross-sectional view showing a variation of a portion of the object transporting apparatus shown in FIGS. 38 through 42.

Next, another example is the constitution shown in FIG. 45. Although objects up to a certain mass can be accommodated by each of the constitutions for prevention of deviation described above, when the mass of object 17 becomes considerably large, since the inertia when object 17 is about to deviate outside the transport path is also large, it is difficult to restrict this deviation with only a wall of sound waves or pressurized gas. Thus, this example is for accommodating heavy objects.

As shown in FIG. 45, flat plate-shaped deviation prevention members 100 are arranged on both sides of the transport path of objects 17 having a large weight (for example, those composed of heavy objects 17b alone). Accordingly, when objects 17 are about to deviate from the transport path, they make extremely light contact with the inside surfaces of these deviation prevention members 100 to avoid deviation.

Furthermore, the present invention is not limited to the constitutions of each of the embodiments described above, but rather a diverse range of constitutions can naturally be realized by mutually combining one portion at a time of two or more of any of the embodiments.

In addition, although duralumin is used for the material of the vibrator in each of the embodiments described above, various other materials can also be employed, examples of which include carbon steel and its alloy, stainless steel, and titanium alloys.

According to the present invention as explained above, the present invention offers the advantage of being able to levitate and transport all types of objects, regardless of whether or not they are magnetic, without any restrictions on the material and so forth of the object used, and including objects which cannot be placed in a magnetic field, and is able to accommodate objects having relatively large weight and dimensions.

In addition, since the apparatus is only required to be minimally provided with essentially a vibrator and an ultrasonic excitation device which excites said vibrator, together with offering the advantage of achieving compact size and reduced cost, it also contributes to reduced energy consumption since electrical power consumption is extremely low.

Moreover, since levitating action is the result of radiation pressure of sound waves converted from electrical energy, together with being able to easily ensure the safety of the operator, it also offers the advantage of being able to be easily controlled by supplying and interrupting its power.

Since the shape of the vibrator can be suitably changed according to the application, and a plurality of apparatuses should simply be arranged in a row to transport an object over a long distance, the present invention has an extremely large degree of freedom as well as excellent general applicability.

Together with the apparatus being able to transport an object above the surface of the vibrator even if a particular traveling device is not provided separately, since said apparatuses should simply be arranged in a row in order to transport an object over a long distance, the present invention has an extremely large degree of freedom as well as excellent general applicability.

Moreover, since a cylindrical member is used for the vibrator and an object is levitated within that cylindrical member, as a result of, for example, the radiation pressure of ultrasonic waves being converged to the center in the axial direction in a simple constitution, the present invention can be used as an air bearing without requiring complicated adjustments. In addition, since there is no particular need for a means for preventing deviation of the object, the present invention also offers the advantage of being easy to use as a transporting apparatus.

In addition, since at least one pair of vibrators are arranged so that their vibrating surfaces mutually intersect, an object can be stably held above the vibrator surface. Thus, deviation of an object from the transport path can be prevented without using special transport guides in a transporting apparatus using this levitating apparatus.

Moreover, in contrast to providing a plurality of ultrasonic vibration generation units of an ultrasonic excitation device in a row in the direction in which an object is to travel, an energy conversion device is provided in the present invention which produces progressive waves by converting ultrasonic energy emitted by each of said ultrasonic vibration generation units into electrical energy. Together with selectively generating ultrasonic energy for each of said ultrasonic vibration generation units, energy conversion is performed to allow reciprocating travel of the object. Accordingly, the present invention offers the advantage of being able to freely transport an object in a desired direction and stop that object at a desired location.

In addition, although vibration of a vibrator in a banded vibration mode is performed during reciprocating travel of the object, in the case of this banded vibration mode, the present invention is able to smoothly perform switching of the direction of travel and stopping of travel of the object. In addition, as a result of employing a flat plate-shaped vibrator, it is easy to produce said effective banded vibration mode.

What is claimed is:

1. An object transporting apparatus that levitates an object and causes the object to travel above a surface of a vibrator by radiation pressure of sound waves of the vibrator, said apparatus comprising:

a vibrator;

an ultrasonic excitation device which excites said vibrator, said ultrasonic excitation device comprising at least two ultrasonic excitation units arranged in a row in a direction in which an object is to be made to travel; and a traveling device which causes the object to travel, wherein said traveling device comprises an energy conversion device which converts sound waves into progressive waves by converting ultrasonic energy, generated by said ultrasonic vibration generation units of said ultrasonic excitation device, into electrical energy.

2. The object transporting apparatus as set forth in claim 1 wherein said ultrasonic excitation device excites said vibrator to perform vibration in a banded vibration mode.

3. The object transporting apparatus as set forth in claim 1 wherein said vibrator is a flat plate.

4. The object transporting apparatus as set forth in claim 1 wherein said traveling device comprises a coil connected in parallel to a resistor, and means for connecting said coil and said resistor with one of said ultrasonic vibration generation units.

* * * * *